United States Patent
Kakehi et al.

[11] Patent Number: 5,934,680
[45] Date of Patent: Aug. 10, 1999

[54] SPLIT RESIN SEAL RING WITH CHAMFERED END CONNECTION STRUCTURES

[75] Inventors: Kozo Kakehi, Kuwana-gun; Jiro Matsumoto, Yokkaichi, both of Japan

[73] Assignee: NTN Corporation, Osaka, Japan

[21] Appl. No.: 08/657,611

[22] Filed: May 31, 1996

[30] Foreign Application Priority Data

| May 31, 1995 | [JP] | Japan | 7-134108 |
| Jun. 30, 1995 | [JP] | Japan | 7-166224 |
| Sep. 29, 1995 | [JP] | Japan | 7-253456 |

[51] Int. Cl.$^6$ .................................................. F16J 9/14
[52] U.S. Cl. ........................................ 277/221; 277/222
[58] Field of Search .................. 277/216, 217, 277/220, 221, 222

[56] References Cited

U.S. PATENT DOCUMENTS

| 1,261,897 | 4/1918 | Bernard | 277/221 |
| 1,316,464 | 9/1919 | Richter | 277/222 |
| 1,348,146 | 8/1920 | Beecher | 277/222 |
| 1,363,281 | 12/1920 | Setter | 277/222 |
| 1,428,654 | 9/1922 | Norman | 277/222 |
| 3,784,215 | 1/1974 | Rutherberg | 277/220 |
| 4,109,924 | 8/1978 | Stucke | 277/220 |
| 4,192,051 | 3/1980 | Bergeron | 277/220 |
| 4,449,721 | 5/1984 | Tsuge | 277/221 |
| 5,513,857 | 5/1996 | Watanabe et al. | 277/217 |

*Primary Examiner*—Scott Cummings
*Attorney, Agent, or Firm*—Wenderoth, Lind & Ponack

[57] ABSTRACT

A composite step-cut type synthetic resin seal ring having a pair of abutments provided at one circumferential point of the ring body and spaced from each other. Each abutment has end face and comprises a protrusion and a shoulder provided adjacent to each other. The protrusion is provided on one axial side of the ring body and the shoulder is provided on the other axial side of the ring body. The end face, protrusion and shoulder of one abutment are complementary in shape to the end face, shoulder and protrusion of the other abutment, respectively. Chamfers are formed at the boundary between an end face of each protrusion and its inner axial side face facing the axial side face of the protrusion of the other abutment when the abutments are fitted together, at the boundary between the end face of protrusion of each abutment and its inner radial surface facing the shoulder of the other abutment when the abutments are fitted together, and at the boundary between the outer radial surface of the shoulder of each abutment and the end face of each abutment.

10 Claims, 25 Drawing Sheets

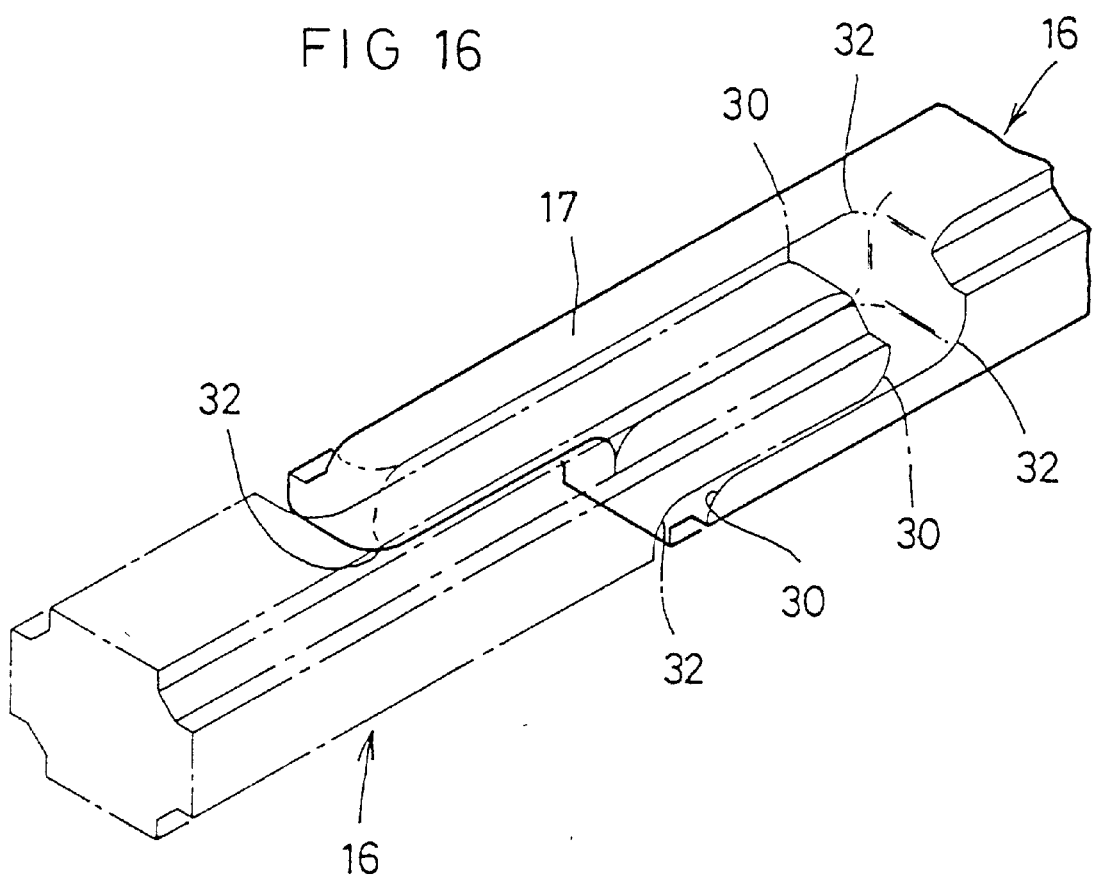

SPLIT RESIN SEAL RING WITH CHAMFERED END CONNECTION STRUCTURES

BACKGROUND OF THE INVENTION

This invention relates to a seal ring made of a synthetic resin for preventing leakage of a liquid such as oil or water and a gas such as air, and more particularly an oil seal ring made of a synthetic resin and mainly used to seal hydraulic oil in a torque converter, a hydraulic clutch and an automatic transmission in an automobile.

Conventional seal rings of this type include a metal seal ring and a seal ring made of tetrafluoroethylene resin. Now, it is considered to form oil seals by injection-molding synthetic resins to improve wear resistance and oil sealing ability and reduce manufacturing costs.

Such a seal ring is split apart at one circumferential point for the convenience of mounting. Such split ends are in the form of straight-cut type abutments 71, 71' as shown in FIG. 23 or composite step-cut abutments 72, 72' as shown in FIG. 24.

A seal ring of this type is mounted in a space between a piston and a cylinder so as to be rotatable when the piston and the cylinder rotate relative to each other and to be slidable relative to the piston and the cylinder when they move axially relative to each other. It is required that such a seal ring not damage the sliding surfaces of the mating members and have a high ability to seal a gap between the piston and the cylinder.

As shown in FIG. 25A, a seal ring 81 is ordinarily mounted in a peripheral groove 83 formed in a shaft 82 with its outer sealing surface 90 pressed against the inner periphery of a cylinder 84 to seal the space between the shaft 82 and the cylinder 84. Also, by pressing one of its side sealing surfaces 85 against a side wall of the peripheral groove 83, the peripheral groove 83 is also sealed.

For a device in which the shaft 82 is rotated, it is proposed to use one of seal rings 81 as shown in FIGS. 26–28 to reduce the sliding frictional resistance and wear produced between the sealing surfaces 85 and the inner walls of the peripheral groove 83 (as disclosed in Unexamined Japanese Utility Model Publication 3-88062).

These seal rings 81 have lubricant grooves 86, 87 and 88 in their respective sealing surfaces 85. By introducing lubricant into these grooves, a lubricant film is formed on the sealing surfaces 85.

To form such a seal ring, it is injection-molded, for ease of releasing, with its abutments 72 and 72' spaced from each other (with no radial overlapping) so that it has a substantially circular shape or a slightly spread circular shape. The seal ring thus injection-molded is mounted on a piston with its abutments 72 and 72' fitted together. The piston is inserted into a cylinder in this state. When the abutments 72 and 72' are fitted together, their corners a and b', a' and b or c and c' may interfere with each other, making it difficult to fit the abutments together.

Also, as shown in FIG. 30, an injection-molded seal ring 73 does not necessarily have a completely circular shape. That is, the abutments 72 and 72' may protrude from the outer periphery of the seal ring 73. Such protrusions will make it difficult to insert the piston 75 into the cylinder 74. Also, such protrusions will form a space 76 between the outer periphery of the seal ring 73 and the inner periphery of the cylinder. A perfect seal is thus not possible.

When the seal ring 73 is rotated in this state, it will slide with its abutments 72, 72' coming locally into contact with the mating member at their tips. This increases the contact surface pressure to such a high level that the oil film eventually disappears, causing wear on the inner periphery of the cylinder 74.

The same problem will occur with a seal ring having a straight-cut abutments 71, 71'. In the case of a seal ring with composite straight-cut abutments 72, 72', if a protrusion 77 of one of the abutments 72 and 72' has a greater thickness than the depth of a shoulder 78 of the other abutment 72', the protrusion 77 will protrude from the outer periphery of the ring, causing the abovementioned problem.

One way to solve this problem is to form a seal ring with such a curvature that it will have a completely circular shape when fitted in the cylinder 74. But it is extremely difficult to form such a seal ring because, for this purpose, many factors including contraction coefficient of the material, machining tolerance of the mold used, etc. have to be taken into account. That is, it is difficult to completely prevent local contact of the abutments with the mating surface at the tips of the abutments.

Another way to insert the seal ring into the cylinder so that it has a completely circular shape is to provide a seal ring 73 injection-molded into a completely circular shape with abutments 72, 72' by machining. But even in this case, if the curvatures of the seal ring and the cylinder 73 are not coincident due to dimensional errors in the outer periphery of the seal ring 73 or the inner periphery of the cylinder 74, it is difficult to completely prevent local contact between the abutments 72, 72' and the cylinder.

In order to maintain a high level of sealability of the sealing surface 85, any of the lubricant grooves 86, 87 and 88 is open only at the inner peripheral side, and closed at the outer peripheral side. Thus, at the outer peripheral side, the sealing surface comes into contact with the inner surface of the peripheral wall 83 over the entire circumference, so that no lubricant film can be formed therebetween on the outer peripheral side. As a result, if the shaft 82 is made of a soft material such as an aluminum alloy, the sealing surface 85 can be worn easily by relative rotation between the seal ring 81 and the shaft 82. If the shaft 82 is made of a less wear-resistant material such as aluminum, the inner surface of the peripheral wall 83 tends to wear.

A first object of the present invention is to provide a seal ring having abutments that are less likely to locally contact with the mating member, and a method of manufacturing such a seal ring by injection molding.

A second object of this invention is to provide a seal ring which is high in its sealing ability and which can form a lubricant film over the entire area of its sealing surface to improve its own wear resistance and the wear resistance of the mating member.

Some of conventional seal rings have a square or rectangular section. To form such a seal ring 81 from a synthetic resin, as shown in FIG. 25B, mating surfaces 93 of a mold 92 are positioned at the corner between one of the side faces 90 and outer surface 91 of the seal ring 81 (i.e. at one end of the outer surface 91). In this arrangement, the point at which burrs are produced is separate from both the side face 90 and the outer periphery 91 and at the corner therebetween. Such burrs are easily removable.

But if radial through grooves 89 are formed in the seal ring to achieve the second object, that is, to form a lubricant film over the entire area of the sealing surface, such grooves will be clogged with burrs 92 when the seal ring is formed by injection molding using the abovementioned mold 92. Thus, it is impossible to achieve the second object.

A third object of this invention is to provide a seal ring of a synthetic resin which can form a lubricant film over the entire area of the sealing surface without being influenced by burrs produced when molding the seal ring.

SUMMARY OF THE INVENTION

According to the present invention, there is provided a seal ring made of a synthetic resin having a ring body and a pair of abutments provided at one circumferential point of the ring body and spaced a predetermined distance from each other, the each abutment comprising a protrusion and a shoulder, the protrusion of each abutment having a shape complementary to and fitting in the shoulder of the other abutment, chamfers being formed at the boundary between an end face of each protrusion and an outer peripheral surface of each protrusion and at the boundary between an end face of each shoulder and an outer peripheral surface of the ring body.

According to the present invention, there is also provided a composite step-cut type synthetic resin seal ring having a ring body and a pair of abutments provided at one circumferential point of the ring body and spaced a predetermined distance from each other abutment has a butt or end face and comprises a protrusion and a shoulder provided adjacent to each other, the protrusion being provided on one side of the ring body in the form of a protrusion protruding from the butt face toward the other abutment, the shoulder being provided on the other side of the ring body in the form of a recess retracting from the butt face. The butt or end face, the protrusion and the shoulder of one abutment are complementary in shape to the butt face, the shoulder and the protrusion of the other abutment, respectively. Chamfers are formed at the boundary between an end face of each protrusion and its inner side face facing the side face of the protrusion of the other abutment when the abutments are fitted together, at the boundary between the end face of the protrusion of each abutment and its inner surface facing the shoulder of the other abutment when the abutments are fitted together, and at the boundary between the outer surface of the shoulder of the each abutment and the butt face of each abutment.

By chamfering the radially outward corners, it is possible to completely eliminate or reduce protrusions at the abutments and thus to prevent the abutments from coming into local contact with the mating member. Leakage of lubricant thus decreases. The mating member is less likely to be worn, too.

By chamfering the corners of the surfaces that are brought into contact with each other when the abutments are fitted together, it is possible to prevent or reduce local contact between the abutments when they are fitted together. Thus, the abutments are less likely to be damaged.

Further, by providing a gap between the opposite faces of the protrusion of one abutment and the shoulder of the other abutment, it is possible to more effectively prevent the protrusion from protruding from the outer periphery of the ring. Also, by providing a gap between the opposite side surfaces of the protrusions, it is possible to more effectively prevent the protrusions from protruding from the sides of the ring.

The manufacturing methods makes it possible to manufacture the seal rings at low costs.

Burrs are formed at a position spaced from each lubricant groove by a distance equal to the height of steps provided along boundaries between both sides of the seal ring and its outer periphery and between both sides and its inner periphery. The lubricant grooves are thus less likely to be clogged with burrs.

Lubricant that leaks through the lubricant grooves forms a lubricant film over the entire width of the sealing surfaces. Since the sliding surfaces are lubricated sufficiently by the lubricant film, wear resistance improves. The mating member is less likely to be damaged. But since the amount of leakage of lubricant is minimal, the sealing ability of the seal ring is maintained.

The steps formed at the four corners prevent the lubricant grooves from being clogged with burrs. Also, the contact surface area decreases by the steps, so that turning torque decreases.

When the amount of lubricant around the seal ring decreases, fresh lubricant is supplied, so that the two mating members can rotate stably for a long time.

Since the side walls of the lubricant grooves form an obtuse angle with the sealing surfaces at the boundary therebetween, it is possible to increase the area ratio of the openings of the lubricant grooves to the entire sealing surfaces while maintaining the high sealing ability of the seal ring. Thus, burrs can be easily removed by tumbling. Also, since the angle between the sealing surfaces and the side walls of the lubricant grooves is obtuse, even particles smaller than the lubricant grooves can be easily removed from the grooves, so that no particles remain in the grooves. Thus, manual post-treatment is not necessary.

Other features and objects of the present invention will become apparent from the following description made with reference to the accompanying drawings, in which:

BRIEF DESCRIPTION OF THE DRAWINGS

FIG. 16 is a perspective view of the abutments of the tenth embodiment;

FIGS. 26A–28A are partial enlarged front views of conventional seal rings;

FIGS. 26B–28B are sectional views of the seal ring shown in FIGS. 26A–28A;

DETAILED DESCRIPTION OF THE EMBODIMENT

Figure 1A:
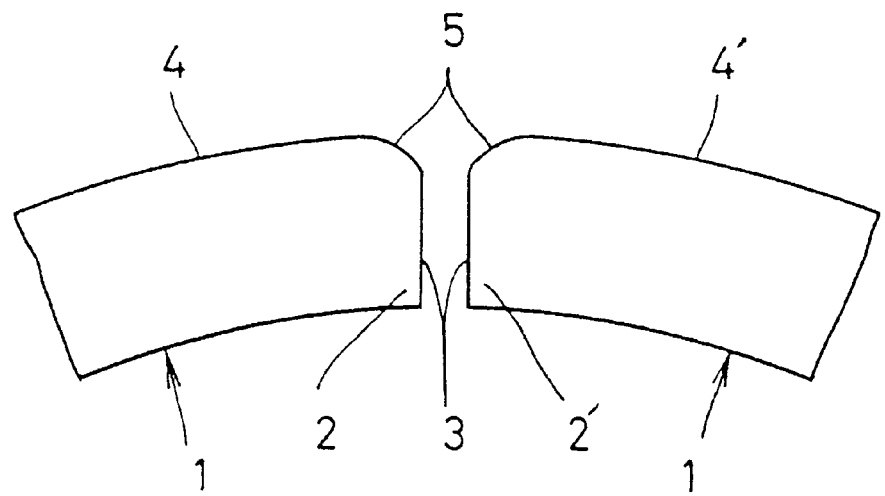
FIG. 1A is a partial front view of a first embodiment of the present invention.
Figure 1B:
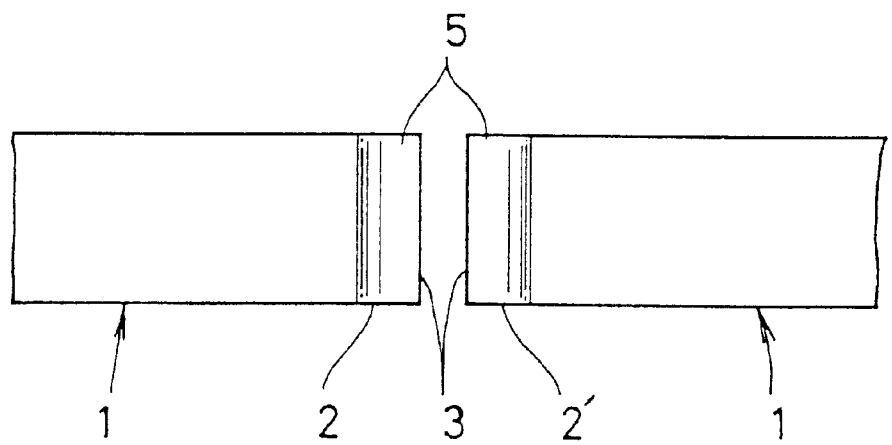
FIG. 1B is a partial plan view of the same.

The seal ring of the first embodiment shown in FIGS. 1A and 1B includes a ring body 1 provided with abutments 2 and 2' spaced circumferentially from each other so as to face each other. The abutments 2, 2', having straight end faces 3, are straight-cut.

Chamfers 5 are formed at the boundaries between the end faces 3 of the abutments 2, 2' and the outer periphery 4, 4' of the ring body 1. In this and the other embodiments, the chamfers 5 may be arcuate ones with a predetermined radius of curvature as shown, or flat ones with no radius. Such chamfers are also called "crowns". The chamfers or crowns may have such a shape that its radius of curvature changes continuously.

Chamfers with a continuously changing radius make it possible to eliminate or minimize any protrusion of tips of the abutments 2, 2' even if the radius of the seal ring is not the same as that of the mating member, and thus to prevent local contact between the seal ring and the mating member.

Figure 2A:
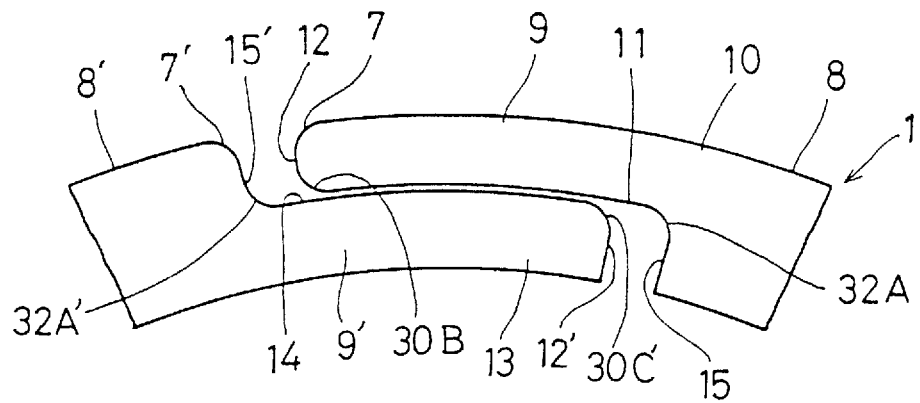
FIG. 2A is a partial front view of a second embodiment of the present invention.
Figure 2B:
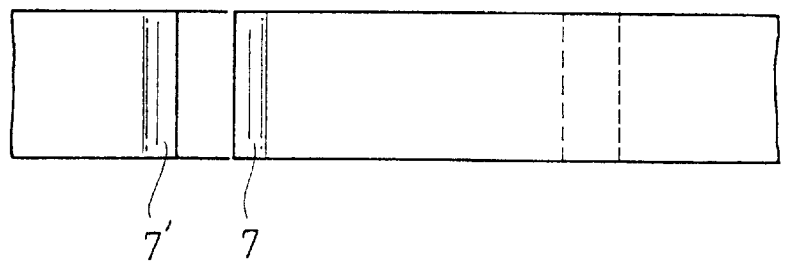
FIG. 2B is a partial plan view of the second embodiment.
Figure 2C:
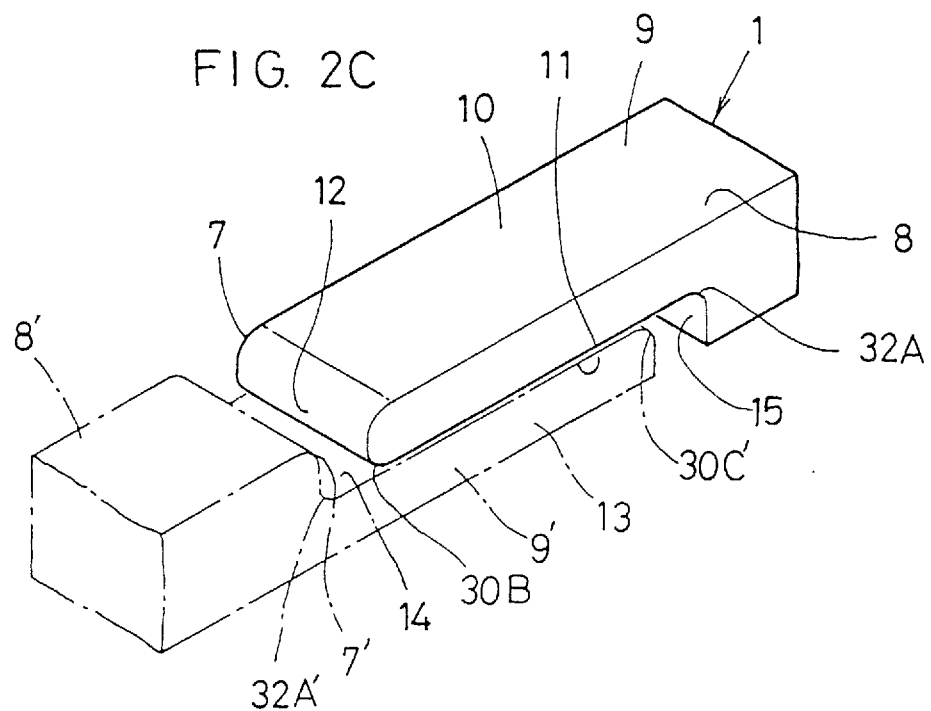
FIG. 2C is a partial perspective view of the second embodiment.

The seal ring of the second embodiment shown in FIGS. 2A, 2B and 2C has step-cut abutments 9 and 9'. The abutment 9 includes an outer-diameter protrusion 10 and a shoulder 11. The abutment 9' includes an inner-diameter protrusion 13 and an outer-diameter shoulder 14. The outer-diameter protrusion 10 of the abutment 9 and the inner-diameter protrusion 13 of the abutment 9' are complementary in shape to the outer-diameter shoulder 14 of the abutment 9' and the inner-diameter shoulder 11 of the abutment 9, respectively, and fit in each other with a predetermined space therebetween.

More specifically, as shown in FIG. 2C, the outer-diameter protrusion 10 is provided at the radially outer half portion of the ring body 1 and protrudes circumferentially from an end face 15 of the ring body 1. Its outer periphery 8 smoothly connects with and has the same curvature as the outer periphery of the ring body 1. The inner-diameter shoulder 11 is provided at the inner side of the outer-diameter protrusion 10.

The other abutment 9' is complementary to the abutment 9. That is, its inner-diameter protrusion 13 is provided at the radially inner half portion of the ring body and protrudes circumferentially from an end face 15' of the ring body 1.

The outer diameter shoulder 14 is provided at the radially outer side of the inner-diameter protrusion 13.

The abutments 9 and 9' are fitted together with a predetermined space left therebetween. The seal ring as a whole is substantially completely round.

One important feature of this invention is that corners facing radially outward are chamfered. Specifically, in the case of the seal ring having the step-cut abutments 9, 9', a chamfer 7 is formed at the boundary between the end face 12 of the outer-diameter protrusion 10 and its outer periphery 8. Also, a chamfer 7' is formed at the boundary between the end face 15' of the outer-diameter shoulder 14 and the outer periphery 8' of the ring body 1.

By providing such chamfers 7, 7', the amount of protrusion of the abutments 9, 9' decreases to zero or near zero, so that it is possible to prevent the seal ring from locally coming into contact with the mating member.

Figure 3A:
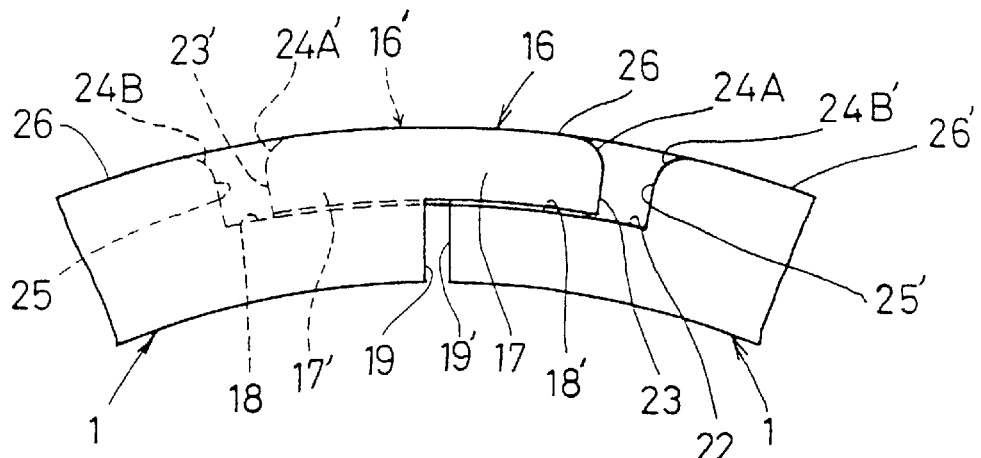
FIG. 3A is a partial front view of a third embodiment of the present invention.
Figure 3B:
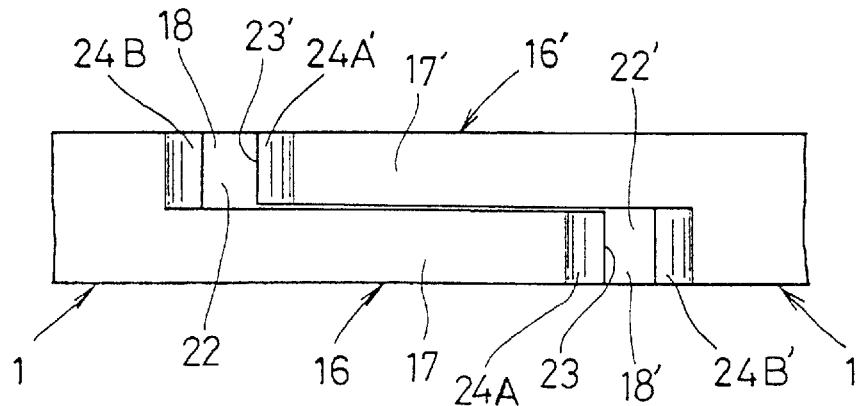
FIG. 3B is a partial plan view of the third embodiment.
Figure 3C:
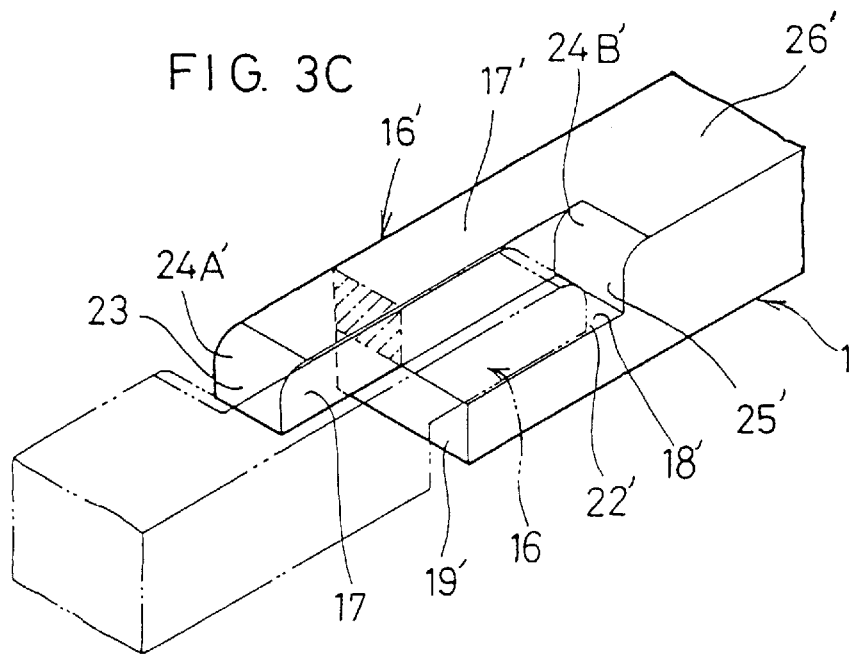
FIG. 3C is a partial perspective view of the third embodiment.

FIGS. 3A, 3B and 3C show the third embodiment. The seal ring of this embodiment has composite step-cut type abutments 16, 16'. The abutments 16, 16' each comprise an outer-diameter protrusion 17, 17' and an outer-diameter shoulder 18, 18'. The protrusions 17 and 17' of the abutments 16 and 16' are complementary in shape to the shoulders 18, 18' of the abutments 16' and 16, respectively. The abutments 16, 16' fit together, keeping a predetermined space therebetween.

More specifically, as shown in FIG. 3C, the protrusion 17' of the abutment 16' is provided at the radially outer portion and a transversely outer portion of the ring body 1 and protrudes circumferentially from an end face 19' of the abutment 16' on a first axial side of ring body 1. The shoulder 18' extends from the end face 19' in the opposite direction on a second axial side of the ring body 1. The direction on a second axial side outer periphery of the protrusion 17' smoothly connects with and has the same curvature as the outer periphery of the ring body 1.

The shoulder 18' is provided at the radially outer half portion and the transversely inner-half portion of the ring body 1. An outer radial surface 22' of shoulder 18' has the same curvature as the inner periphery of the ring body 1.

The other abutment 16 is complementary to the abutment 16'. The abutments 16 and 16' are fitted together with a predetermined space left therebetween. The seal ring as a whole is substantially completely round.

One important feature of this invention is that chamfers are provided at corners facing radially outward. Specifically, in the case of the seal ring having the composite step-cut abutments 16, 16', chamfers 24A, 24A' are formed at the boundaries between the end faces 23, 23' of the protrusions 17, 17' and their outer peripheries 26, 26'. Similarly, chamfers 24B, 24B' are formed at the boundaries between the end faces 25, 25' of the shoulders 18, 18' and the outer periphery 26, 26' of the ring body 1.

By providing such chamfers 24A, 24A', 24B, 24B', the amount of protrusion of the abutments 16, 16' decreases to zero or near zero, so that it is possible to prevent the seal ring from locally coming into contact with the mating member.

Figure 4A:
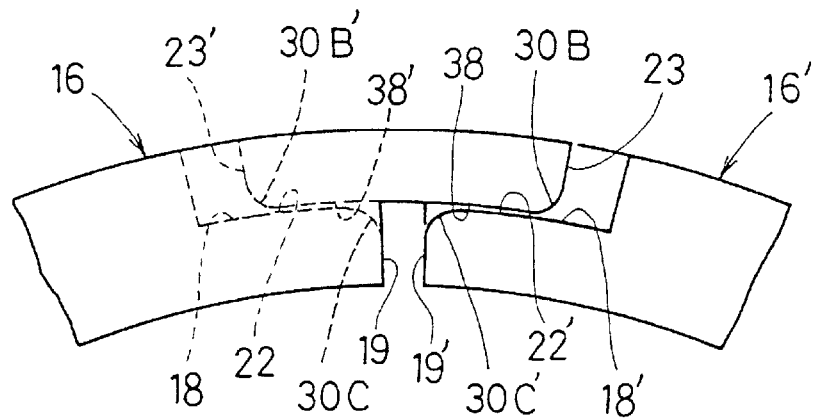
FIG. 4A is a partial front view of a fourth embodiment of the present invention.
Figure 4B:
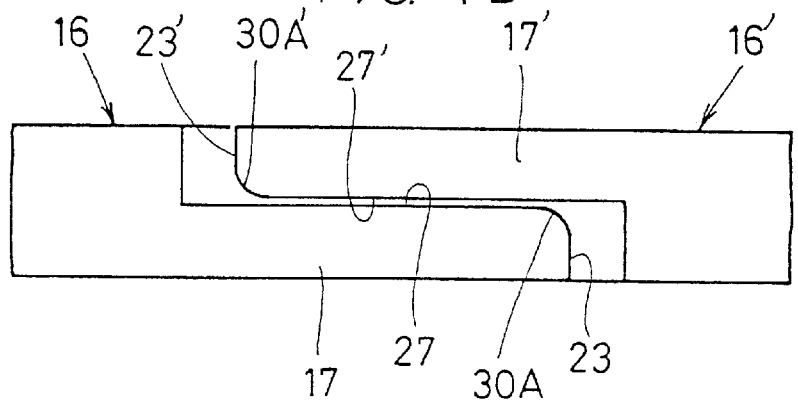
FIG. 4B is a partial plan view of the fourth embodiment.
Figure 4C:
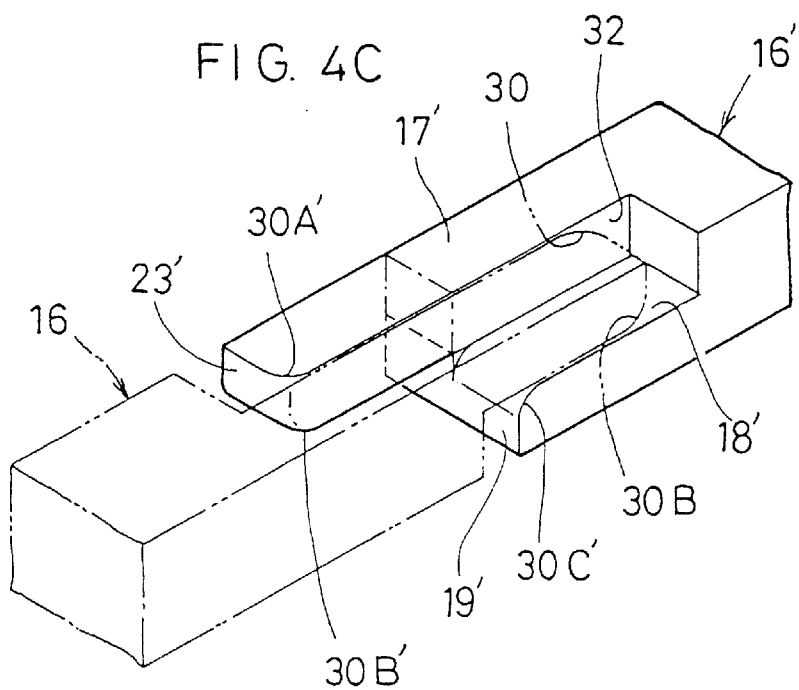
FIG. 4C is a partial perspective view of the fourth embodiment.

In the arrangement of the fourth embodiment shown in FIGS. 4A, 4B and 4C, it is possible to prevent damage to the seal ring such as breakage and cracks due to local contact when the composite step-cut type abutments 16 and 16' are fitted together. Structurally, the composite step-cut abutments 16, 16' of this embodiment are the same as those shown in FIGS. 3A, 3B and 3C except the chamfers.

In this embodiment, chamfers are provided at the corners of the abutments 16 and 16' which come into contact with each other when the abutments 16 and 16' are fitted together. More specifically, chamfers 30A, 30A' are formed at the boundaries between the end faces 23, 23' of the outer-diameter protrusions 17, 17' and their side faces 27, 27' adapted to face each other when the abutments 16 and 16' are fitted together. Also, chamfers 30B, 30B' are formed at the boundaries between the end faces 23, 23' of the outer-diameter protrusions 17, 17' and their surfaces adapted to face the inner surfaces 22 of the shoulders 18, 18' when the abutments 16 and 16' are fitted together. Further, chamfers 30C, 30C' are formed at the boundaries between the end faces 19, 19' of the abutments 16, 16' and the outer radial surfaces 22, 22' of the shoulders 18, 18'.

By providing such chamfers 30A, 30A', 30B, 30B', 30C, and 30C', local contact between the abutments 16 and 16' can be avoided or reduced when they are fitted together, so that it is possible to prevent damage to the abutments.

Figure 5A:
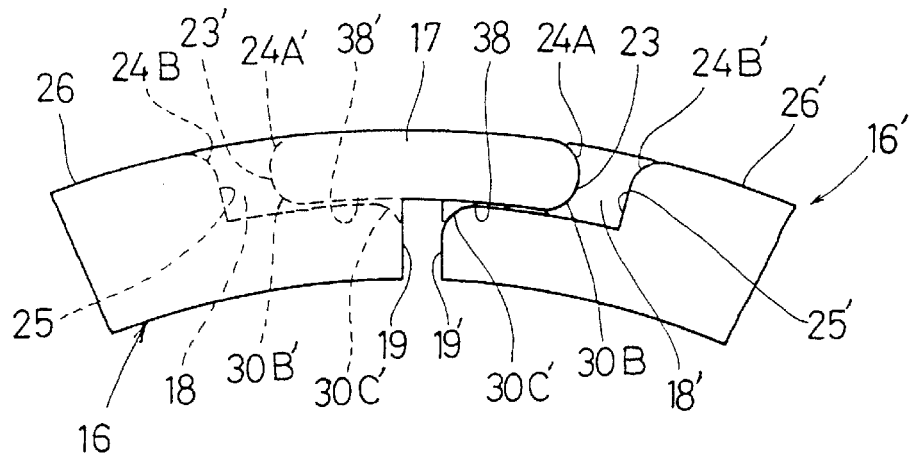
FIG. 5A is a partial front view of a fifth embodiment of the present invention.
Figure 5B:
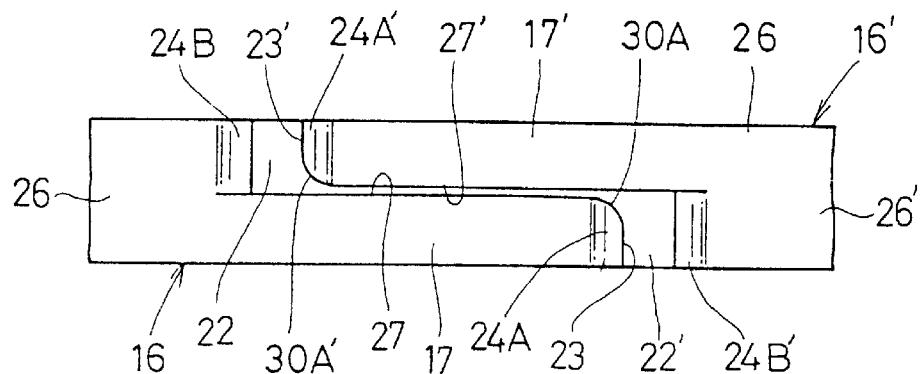
FIG. 5B is a partial plan view of the fifth embodiment.
Figure 5C:
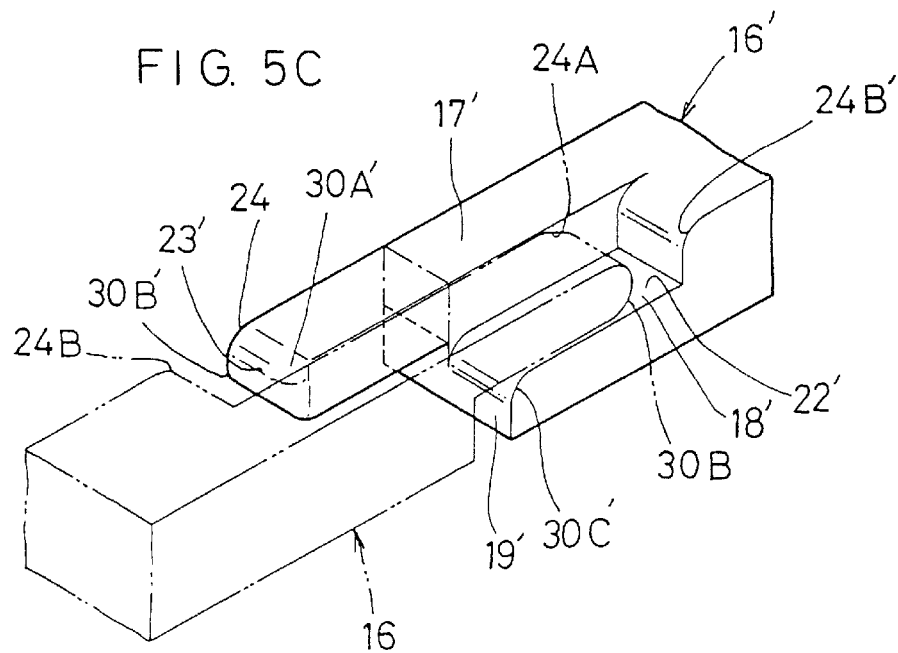
FIG. 5C is a partial perspective view of the fifth embodiment.

The fifth embodiment shown in FIGS. 5A, 5B and 5C is a combination of the arrangements of the third and fourth embodiments.

In this embodiment, chamfers are formed at the corners facing radially outward and at the corners adapted to be brought into contact with each other when the abutments 16 and 16' are fitted together. Specifically, chamfers 24A, 24A', 24B, 24B' are formed as in the embodiment shown in FIG. 3A–3C. Further, chamfers 30A, 30A' 30B, 30B', 30C, 30C' are formed as in the embodiment shown in FIGS. 4A–4C.

By providing these chamfers 24A, 24A', 24B, 24B', the amount of protrusion of the abutments 16, 16' decreases to zero or near zero, so that it is possible to prevent the seal ring from locally coming into contact with the mating member. Besides, by forming the chamfers 30A, 30A', 30B, 30B', 30C, 30C', local contact between the abutments 16 and 16' can be avoided or reduced when they are fitted together, so that it is possible to prevent damage to the abutments.

Figure 6A:
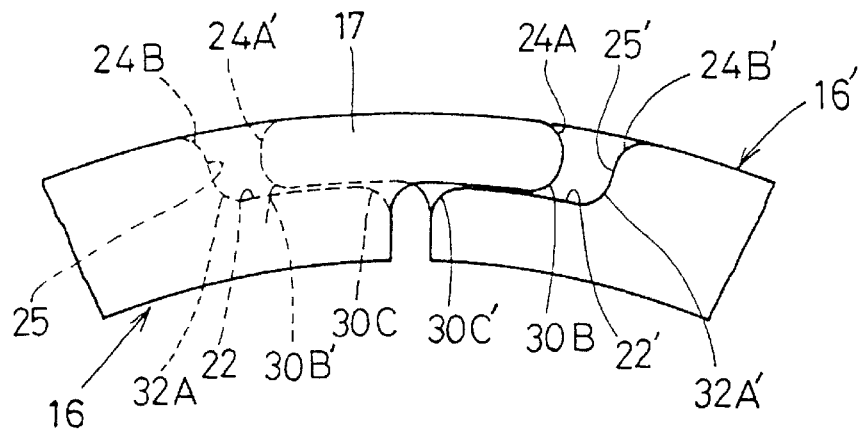
FIG. 6A is a partial front view of a sixth embodiment of the present invention.
Figure 6B:
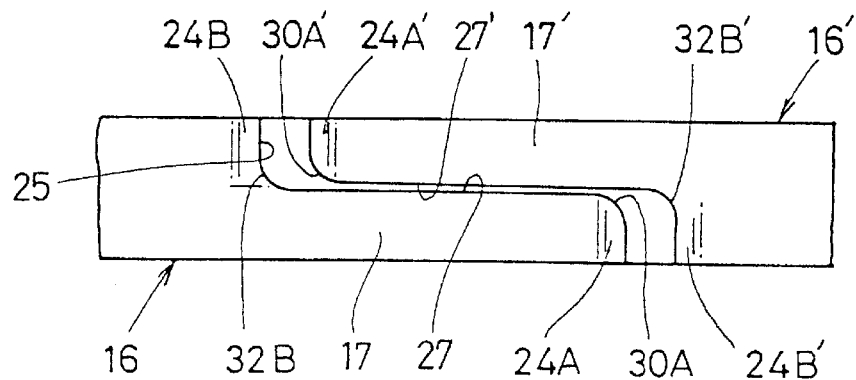
FIG. 6B is a partial plan view of the sixth embodiment.
Figure 6C:
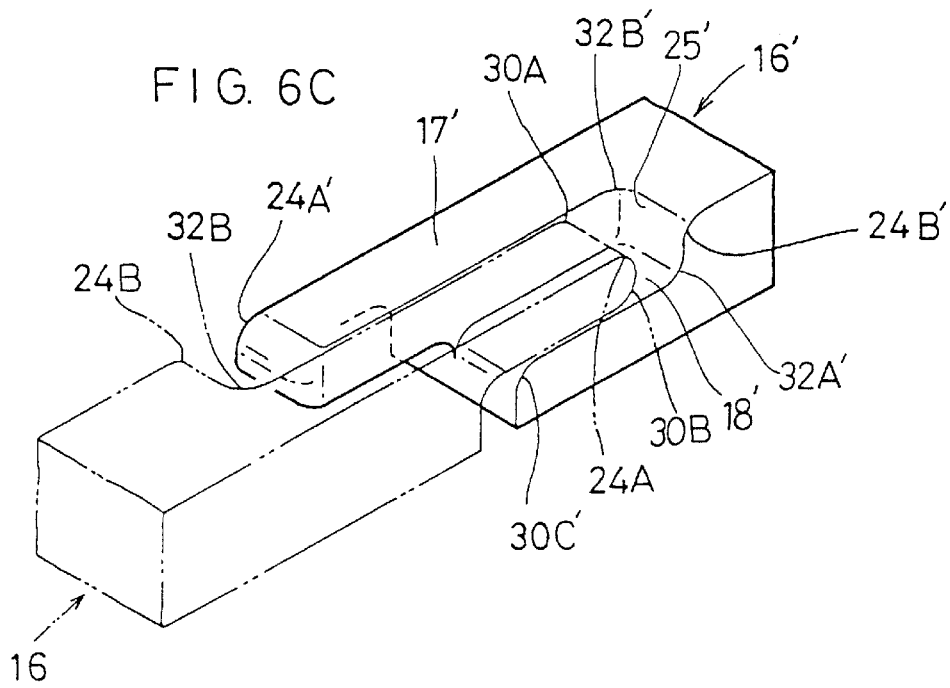
FIG. 6C is a partial perspective view of the sixth embodiment.

The sixth embodiment shown in FIGS. 6A, 6B and 6C is the same as the fifth embodiment except that fillets 32A, 32A', 32B, 32B' are provided on the corners between the end faces 25, 25' of the shoulders 18, 18' and the side faces 27, 27' of the protrusions 17, 17' and between the end faces 25, 25' of the shoulders 18, 18' and their inner surfaces 22, 22' to round these corners. Since the protrusions 17 and the shoulders 18 are reinforced by these fillets, it is possible to prevent damage to the seal ring due to local contact when the abutments 16 and 16' are fitted together.

Such fillets 32A, 32A', 32B, 32B' may be used not only in the sixth embodiment but also in the second to fourth embodiments to achieve the abovementioned benefits.

The chamfers 30B, 30C' and fillets 32-1, 32-2 shown in FIG. 2 can also prevent damage to the seal ring due to local contact when the abutments are fitted together as with the chamfers and fillets used in the other embodiments.

Similar chamfers and/or fillets may be provided at other angular corners other than the aforementioned corners.

While such chamfers and fillets may be arcuate surfaces with a radius or flat surfaces with no radius, arcuate surfaces are preferable. The minimum size of each chamfer or fillet should be about 5%–50%, preferably about 5%–25%, of the width or thickness of the seal ring. If this value is too small, the mating members may be damaged by the abutments if they protrude slightly.

The maximum size of each chamfer or fillet should be about 5–50%, preferably about 25–50%, of the outer or inner diameter of the seal ring or a value therebetween. If this value is too large, the chamfers can scarcely perform their expected functions, because the curvature of such large chamfers is practically no different from that of the outer periphery of the seal ring. That is, such chamfers cannot reduce the amount of protrusion of the abutments to zero or near zero.

Figure 7A:
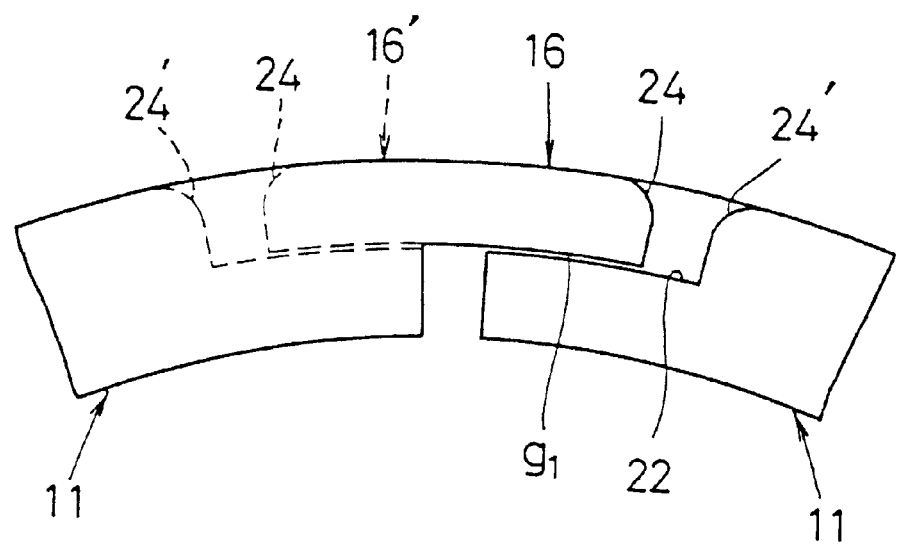
FIG. 7A is a partial front view of a seventh embodiment of the present invention.
Figure 7B:
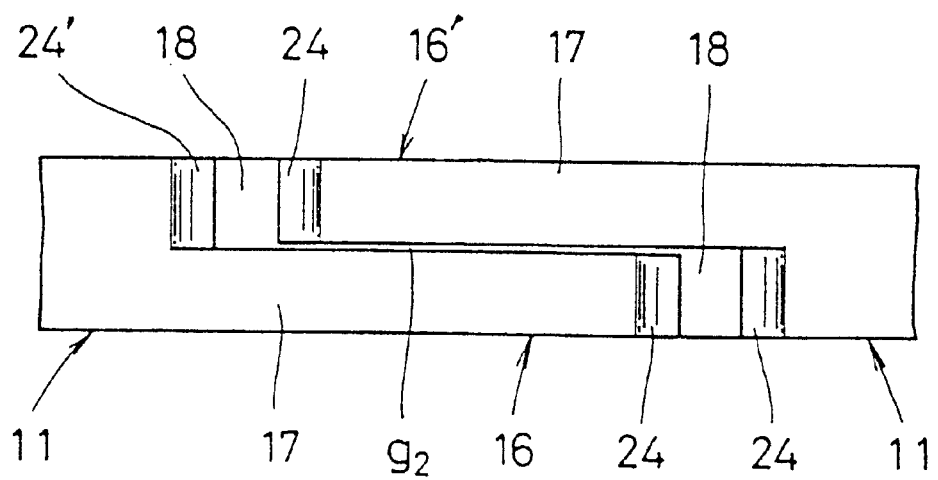
FIG. 7B is a partial plan view of the seventh embodiment.

The seventh embodiment shown in FIGS. 7A and 7B differs from the third embodiment in that gaps g1 are present between the inner surfaces of the protrusions 17, 17' of the abutments 16 and 16' and the outer surfaces 22, 22' of the shoulders 18, 18' of the abutments 16' and 16. Such gaps g1 further reduce the protruding length of the protrusions from the outer periphery of the seal ring by absorbing dimensional errors of the protrusions 17, 17' and the shoulders 18, 18' in the thickness direction.

Also, a gap g2 is provided between the inner side faces 27, 27' of the protrusions 17, 17' of the abutments 16, 16'. The gap g2 prevents the protrusions 17, 17' from protruding from the sides of the seal ring by absorbing dimensional errors of the protrusions 17, 17' in the width direction.

These benefits are equally achievable by providing such gaps g1 and g2 in any of the first to sixth embodiments. That is, it is possible to prevent the protrusions 17, 17' from protruding from both sides of the seal ring and to prevent damage to the seal ring due to local contact between the abutments 16 and 16' when they are fitted together.

Description is now made of a method of forming the seal ring having the composite step-cut abutments 16, 16' of the third embodiment from a synthetic resin, though this method can be used to manufacture the seal rings of the first, second and fourth to seventh embodiments as well.

Figure 8A:
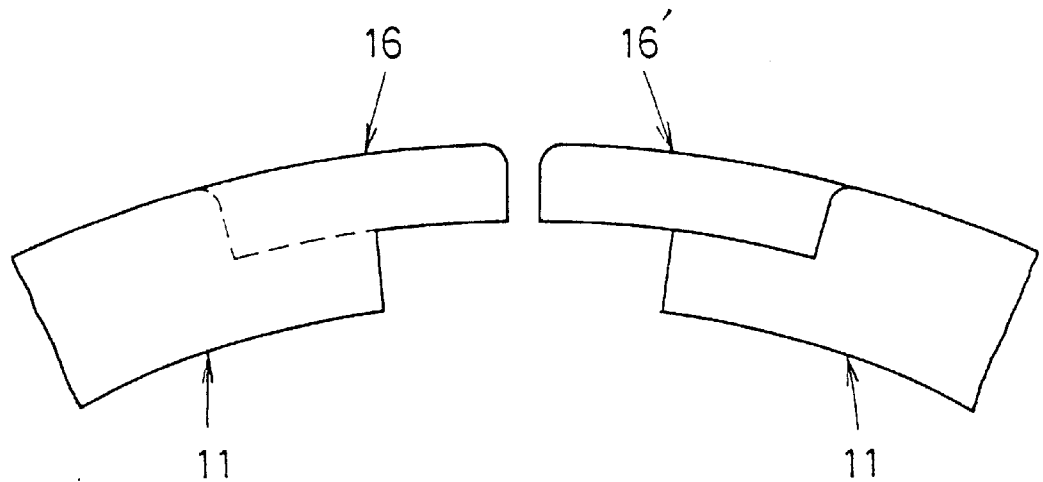
FIG. 8A is a partial front view of a molded seal ring.
Figure 8B:
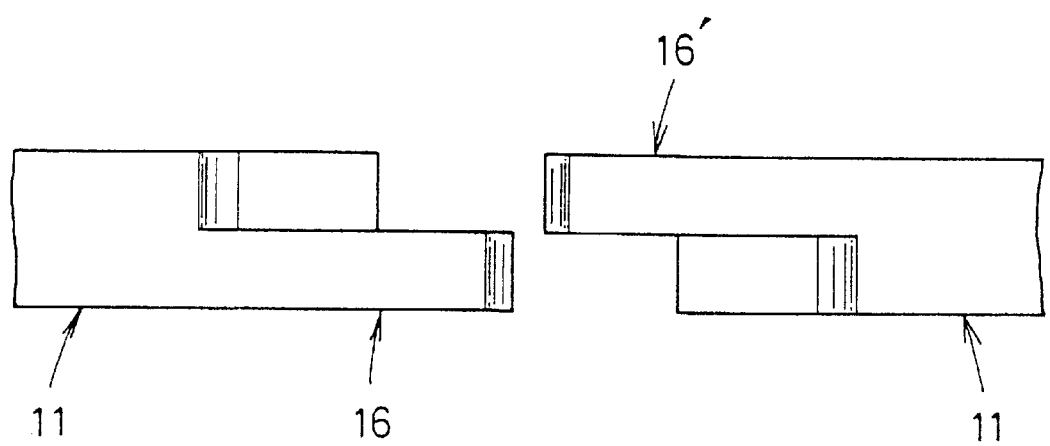
FIG. 8B is a partial plan view of the molded seal ring of FIG. 8A.
Figure 9:
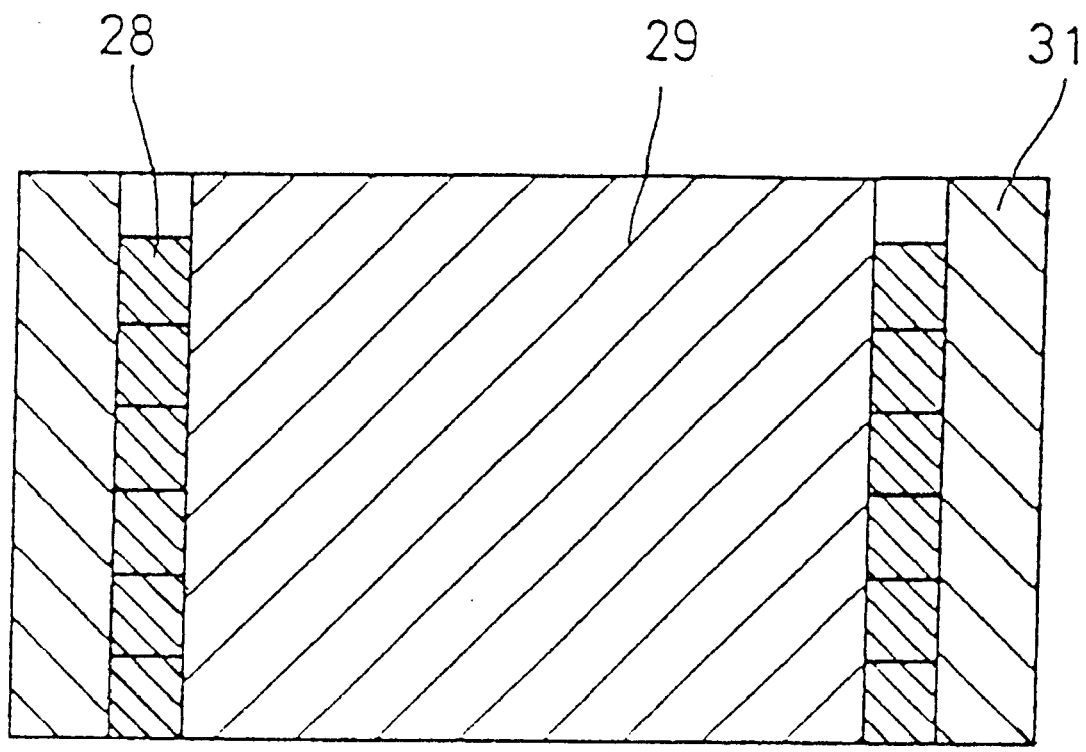
FIG. 9 is a sectional view showing a thermal fixation treatment.

First, a plurality of seal ring members 28 as shown in FIG. 8 are formed by injection molding so that the abutments 16, 16' are separated from each other without radially overlapping each other. The seal ring members 28 thus formed are set in a jig comprising a cylindrical member 29 and a ring gauge 31 as shown in FIG. 9. That is, the seal ring members 28 are inserted in the ring gauge 31 of the jig and then the cylindrical member 29 is inserted in the seal ring members 28. As the resin forming the cylindrical member 29, a material having a larger thermal expansion coefficient than the material forming the ring gauge 31, e.g. a polymer such as a resin or elastomer having a larger thermal expansion coefficient than the ring gauge 31, should be selected so that the seal ring members 28 are pressed against the ring gauge 31 by the cylindrical member 29 due to its thermal expansion when the jig is heated. If the cylindrical member 29 is made of an elastomeric polymer, its hardness (Hs) should be about 60–100, preferably about 65–90, to press the seal ring members 28 at a suitable elastic pressure. If the cylindrical member 29 is too hard, it is difficult to insert the member 29 into the seal ring members 28. If too soft, it is impossible to press the seal ring members 28 at a suitable pressure.

The jig is then put in a furnace such as an electric furnace and heated to a temperature higher than the glass transition point of the base resin of the seal ring members 28 to thermally fix the seal ring members 28 and thereby form composite step-cut type seal rings.

Now we will explain the shapes of various seal rings.

The seal ring 50 of the eighth embodiment has abutments 60 as shown in FIG. 19. It has lubricant grooves 52 formed at three points spaced from one another at equal angular intervals and extending across a sealing surface 51 on one side of the seal ring 50 from its inner sealing surface to outer sealing surface 54. Also, similar lubricant grooves 52 are formed across a sealing surface 51 on the other side at three positions slightly displaced from the grooves 52 on the opposite side.

Figure 25A:
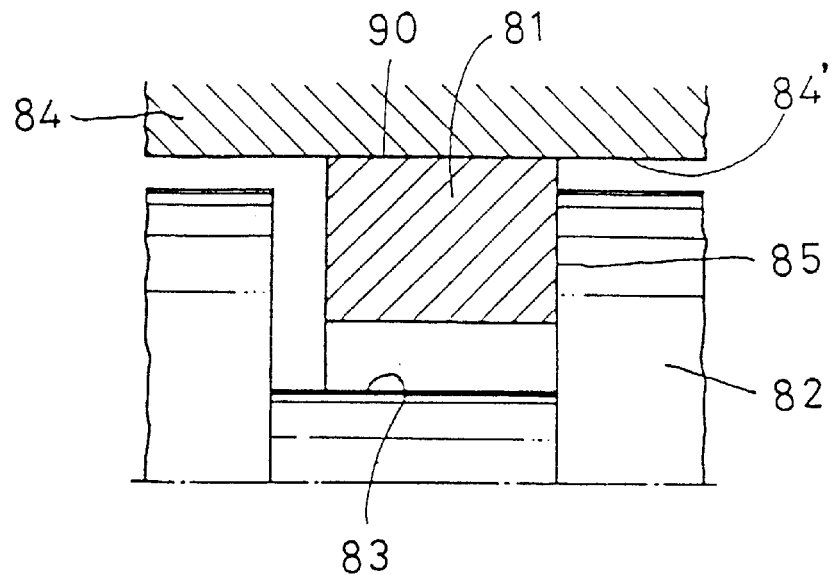
FIG. 25A is an enlarged sectional view of a conventional seal ring while in use.
Figure 25B:
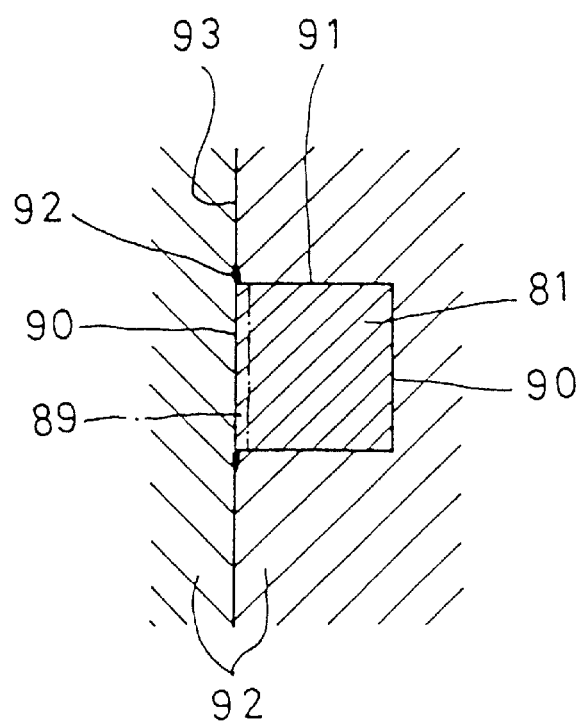
FIG. 25B is an enlarged sectional view of the seal ring shown in FIG. 25A when molded.
Figure 26A:
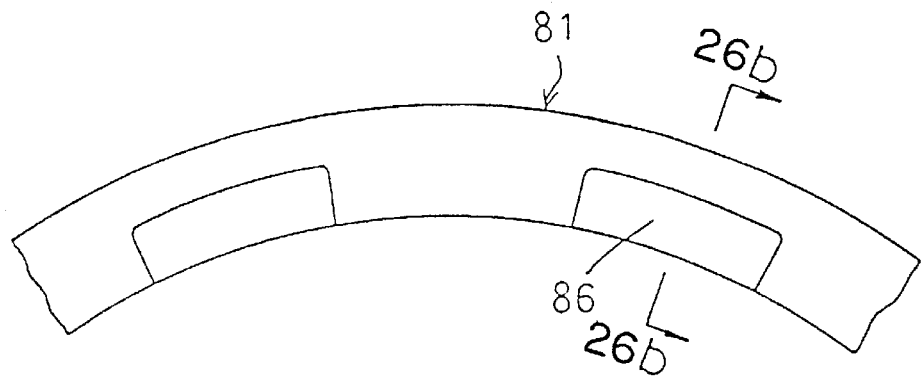
Figure 26B:
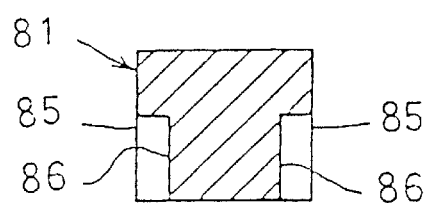
Figure 27A:
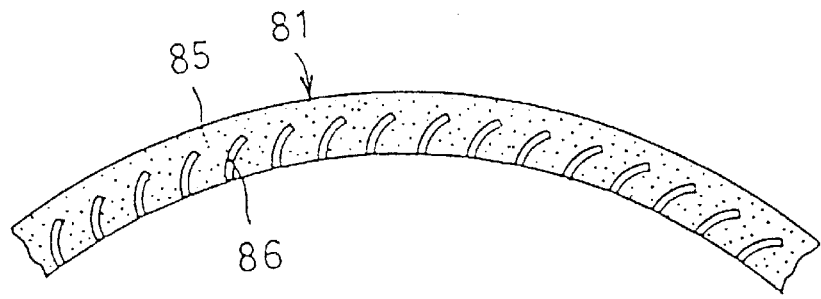
Figure 27B:
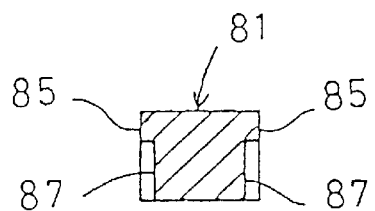

The lubricant grooves 52 have side walls that form an obtuse angle θ, i.e. an angle more than 90° and less than 180°, preferably 120°–135°, with respect to the sealing surfaces 51. Each groove 52 is so small, with a depth of about 0.2 mm and a width of about 0.35 mm at the bottom, that the grooves 52 provided at only three points of the seal ring will never impair the sealing ability of the seal ring. By varying the angle θ, it is possible to adjust the area at the open end of each groove 52. If burrs are formed, they can be easily removed by barreling, using a mold shown in FIG. 25B.

Crowns may be formed at the boundaries between the side walls of the lubricant grooves 52 and the sealing surfaces 51, between the sealing surfaces 51 and the outer sealing surface 54 or inner sealing surface, or between any adjacent surfaces of the abutments.

In the eighth embodiment, steps may be formed at the boundaries between the sealing surfaces 51 and the outer sealing surface 54 or inner sealing surface. This arrangement is shown in FIG. 11 as the ninth embodiment.

The seal ring 50 of this embodiment has lubricant grooves 52 formed at three points spaced from one another at equal angular intervals and extending across a sealing surface 51 on one side of the seal ring 50 from its inner to outer side. Also, similar lubricant grooves 52 are formed across a sealing surface on the other side at positions slightly displaced from the grooves 52 on the opposite side.

Figure 11A:
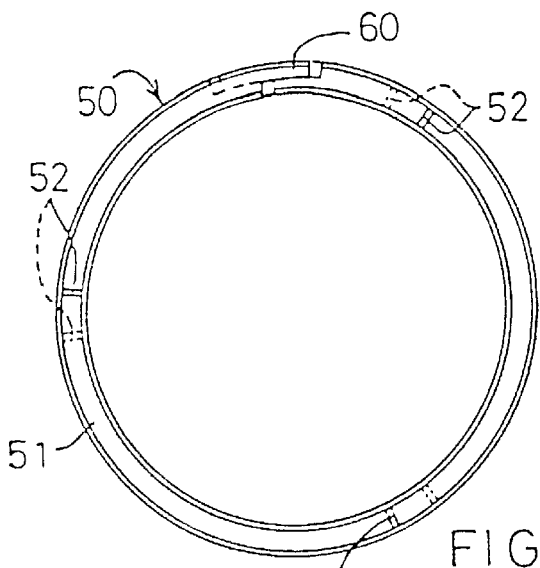
FIG. 11A is a front view of a ninth embodiment of the present invention.
Figure 11C:
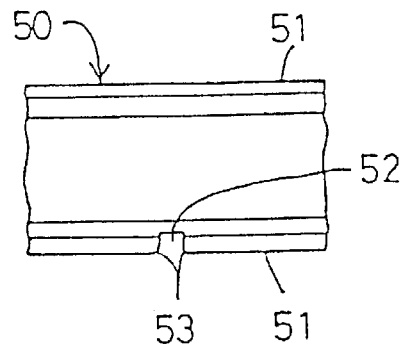
FIG. 11C is a partial enlarged plan view of the ninth embodiment.
Figure 11B:
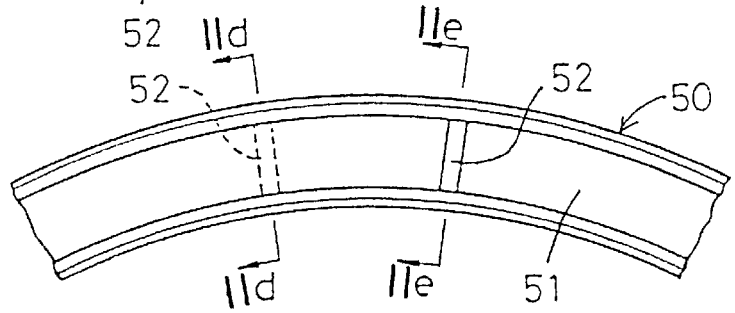
FIG. 11B is a partial enlarged front view of the ninth embodiment.

Each groove 52 is so small, with a depth of about 0.1 mm and a width of about 0.1 mm at the bottom, that the grooves 52 provided at 1–5 points as shown, preferably 1–3 points, of the seal ring will never impair the sealing ability of the seal ring. Chamfers 53 are formed at the boundaries between the side walls of the lubricant grooves 52 and the sealing surfaces 51 (FIG. 11C).

Figure 11D:
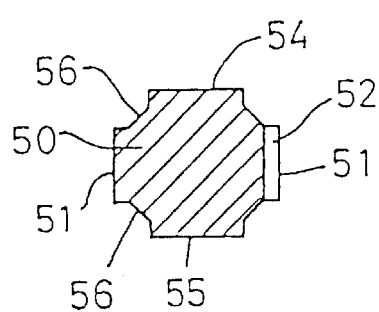
FIG. 11D is a sectional view taken along line d—d of FIG. 11B.
Figure 11E:
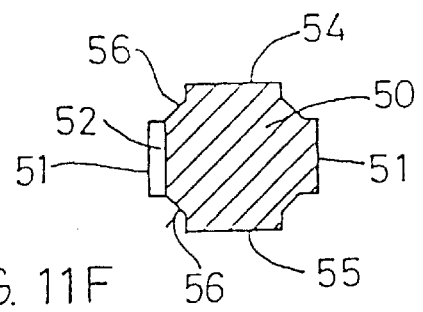
FIG. 11E is a sectional view taken along line e—e of FIG. 11B.
Figure 11F:
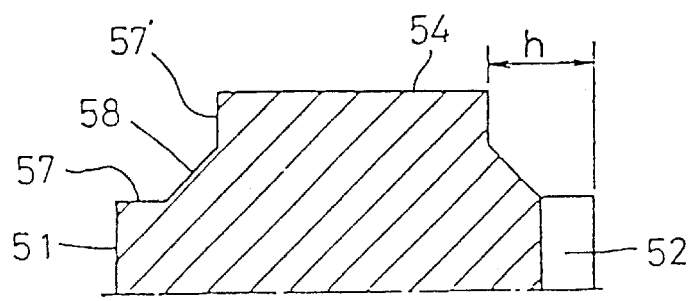
FIG. 11F is a partial enlarged sectional view of FIG. 11D.

As will be apparent from the sectional views of FIGS. 11D and 11E, the seal ring 50 has steps 56 formed along the boundaries between the sealing surfaces 51 and the outer surface 54 and between the sealing surfaces 51 and the inner surface 55. As shown in FIG. 11F, the steps 56 each comprise a surface 57 perpendicular to the sealing surfaces 51, a surface 57' perpendicular to the outer surface 54, and an inclined surface 58 connecting the surfaces 57 and 57'. Their height h is greater than the depth of the lubricating grooves 52.

While the height h of the steps 56 is not limited, it is preferably about 5–50%, more preferably about 5–25%, most preferably about 5–10%, of the radial length or axial width or thickness of the rectangular section of the seal ring 50. Such steps are preferably formed on one or both sides of the seal ring 50.

If the height h of the steps is too small, problems may arise if the relative position between the movable mold and the fixed mold varies at short intervals after the molds have been used for a long time. If too large, the sealing surface area of the seal ring, what is called the seal land area will decrease, making it difficult for the seal ring to perform its sealing function in a secure and stable manner.

FIG. 16 is a perspective view of the embodiment shown in FIG. 14.

As shown in FIG. 20, the lubricant grooves 52 of the ninth embodiment have side walls that form a right angle, i.e. 90° or an obtuse angle θ, i.e. an angle more than 90° and less than 180°, preferably 120°–135°, with the sealing surfaces 51. Each groove 52 is so small, with a depth of about 0.2 mm and a width of about 0.35 mm at the bottom, that the grooves 52 provided at only three points of the seal ring will never impair the sealing ability of the seal ring. By varying the angle θ, it is possible to adjust the area at the open end of each groove 52.

Figure 20A:
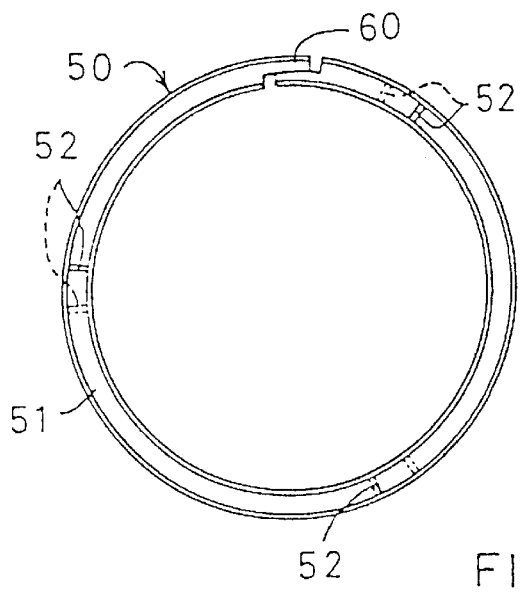
FIG. 20A is a front view of the ninth embodiment in which the angle of lubricant grooves is obtuse.
Figure 20C:
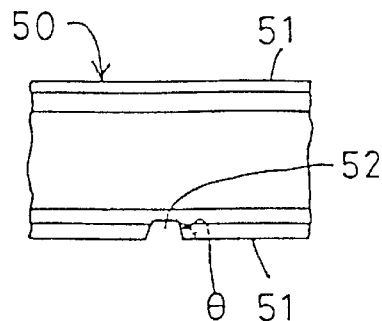
FIG. 20C is a partial enlarged plan view of the ninth embodiment.
Figure 20B:
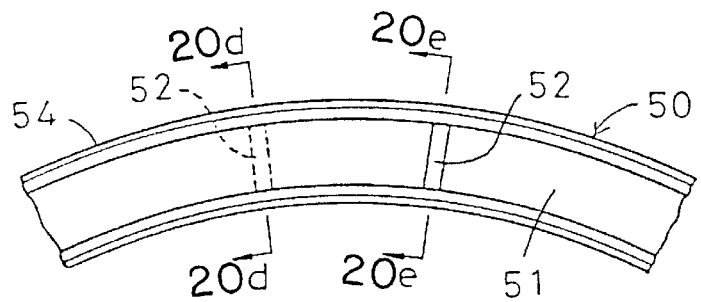
FIG. 20B is a partial enlarged front view of the ninth embodiment.
Figure 20D:
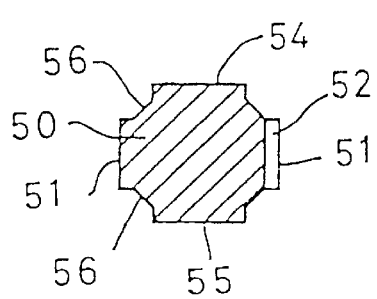
FIG. 20D is a sectional view taken along line 20d—20d of FIG. 20B.
Figure 20E:
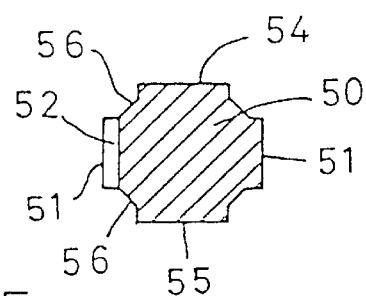
FIG. 20E is a sectional view taken along line 20e—20e of FIG. 20B.
Figure 20F:
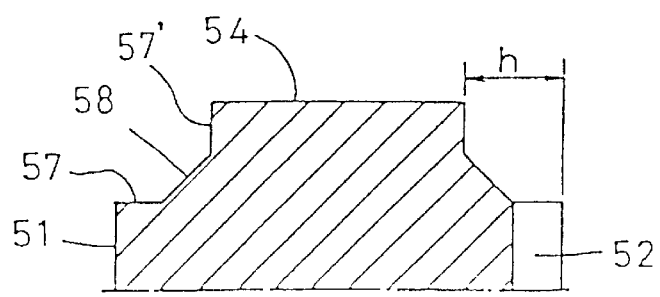
FIG. 20F is a partial cylindrical enlarged front view of FIG. 20D.

As will be apparent from FIGS. 20D and 20E, the seal ring 50 has steps 56 formed along the boundaries between the sealing surfaces 51 and the outer surface 54 and between the sealing surfaces 51 and the inner surface 55. As shown in FIG. 20F, the steps 56 each comprise a surface 57 perpendicular to the sealing surfaces 51, a surface 57' perpendicular to the outer surface 54, and an inclined surface 58 connecting the surfaces 57 and 57'. Their height h is greater than the depth of the lubricating grooves 52.

While the height h of the steps 56 is not limited, it is preferably about 5–50%, more preferably about 5–25%, most preferably about 5–10%, of the width or thickness of the rectangular section of the seal ring 50. Such steps are preferably formed on one or both sides of the seal ring 50.

If the height h of the steps is too small, problems may arise if the relative position between the movable mold and the fixed mold varies at short intervals after the molds have been used for a long time. If too large, the sealing surface area of the seal ring or seal land area will decrease, making it difficult for the seal ring to perform its sealing function in a full and stable manner.

Figure 12:
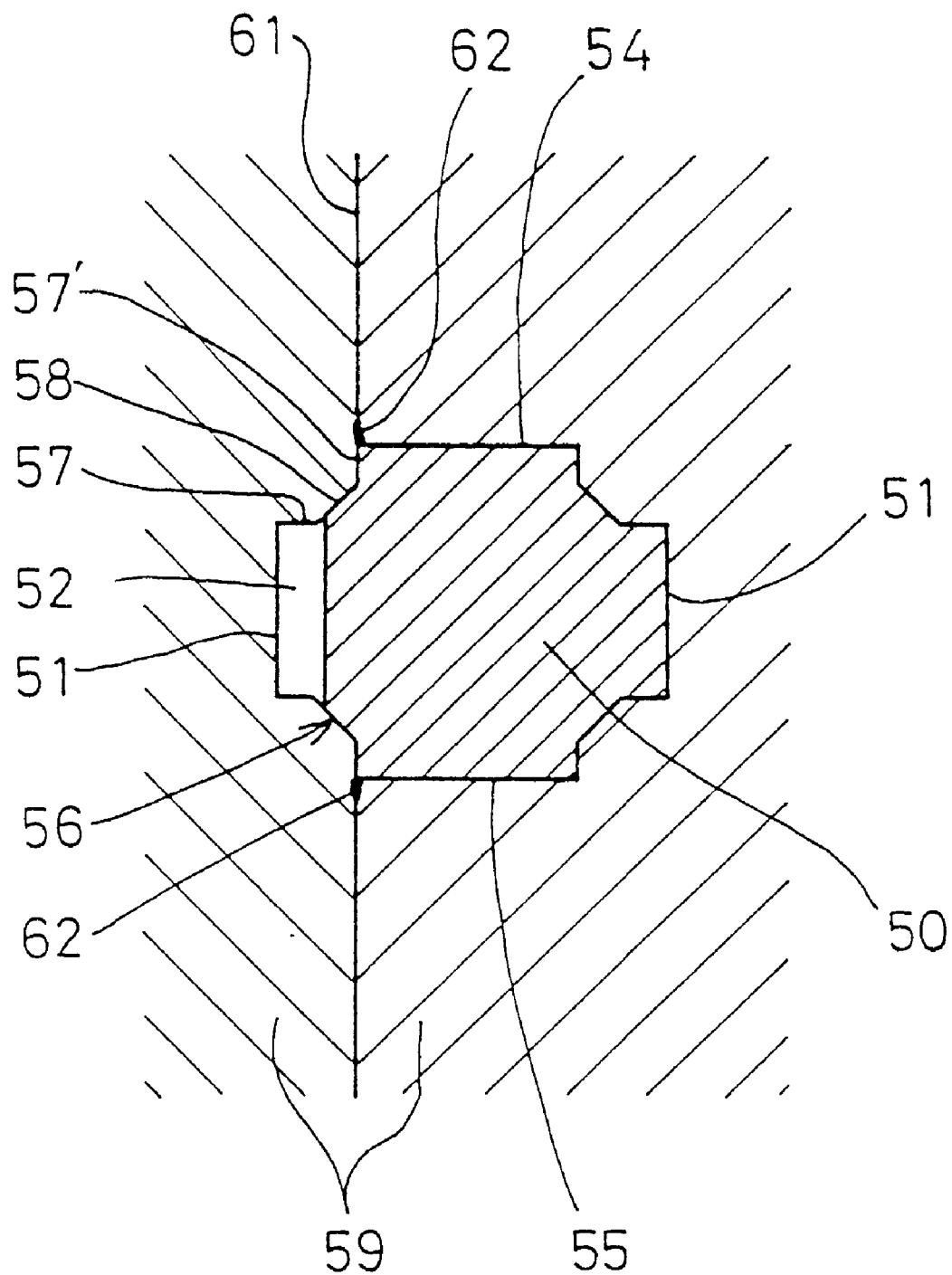
FIG. 12 is a sectional view of the ninth embodiment when it is molded.

FIG. 12 shows the position of the mating surfaces 61 of molds 59 when forming the seal ring 50 by injection-molding a synthetic resin. As shown, the mating surfaces 61 are positioned at the end of the step 56 on one side of the outer surface 54. By providing the mating surfaces 61 in this position, burrs 62 are produced, if any, at a position away from the lubricant grooves 52. It is not necessary to remove such burrs 62 because they never clog the lubricant grooves 52.

Figure 13A:
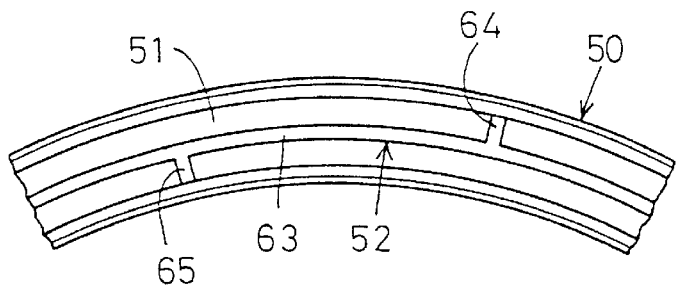
FIG. 13A is a partial enlarged front view of a tenth embodiment of the present invention.
Figure 13B:
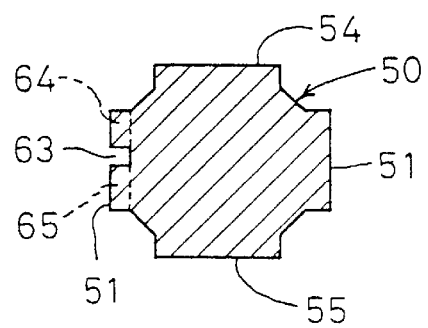
FIG. 13B is a sectional view of the tenth embodiment.

FIGS. 13A and 13B show the seal ring 50 of the tenth embodiment. It has a lubricant groove 52 in each sealing surface 51. Each lubricant groove 52 comprises a circumferential groove 63 extending over the entire circumference of the sealing surface 51 at its radially central portion, and radial grooves 64 and 65 extending radially outward and radially inward from the circumferential groove 63, respectively. The radial grooves 64 and 65 are provided offset circumferentially from each other.

Figure 14A:
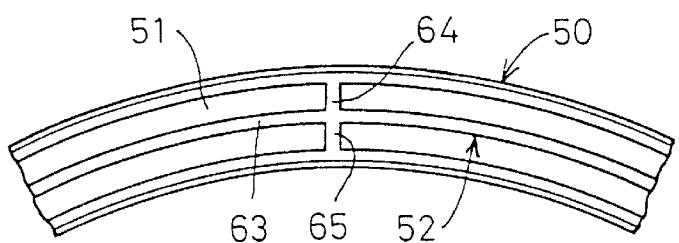
FIG. 14A is a partial enlarged front view of an eleventh embodiment of the present invention.
Figure 14B:
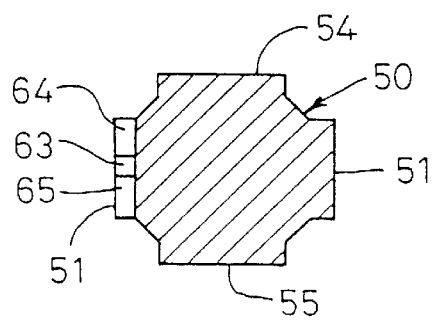
FIG. 14B is a sectional view of the eleventh embodiment.

In the 11th embodiment shown in FIGS. 14A and 14B, the radial grooves 64 and 64 of each lubricant groove 52 extend radially outward and radially inward from the same one point of the circumferential groove 63.

Figure 15A:
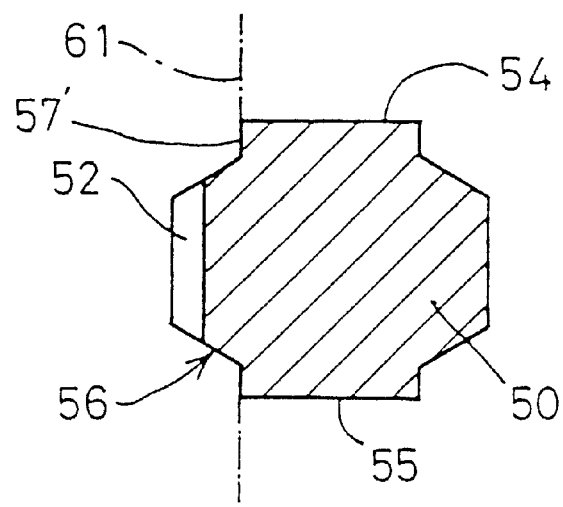
FIG. 15A is a sectional view of a different seal ring.
Figure 15B:
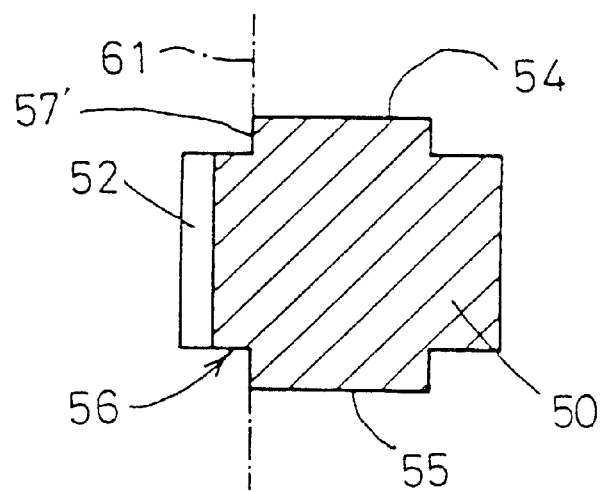
FIG. 15B is a sectional view of a still different seal ring.
Figure 17A:
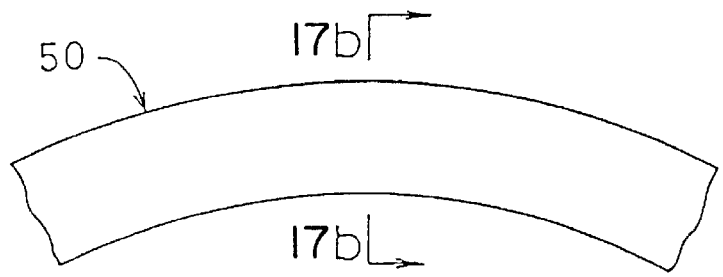
FIG. 17A is a partial enlarged front view of Comparative Example 2.
Figure 17B:
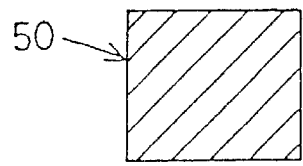
FIG. 17B is a sectional view taken along line 17b—17b of FIG. 17A.

FIGS. 15A and 15B show different kinds of steps 56. Since steps are present between the mating surfaces 61 of molds and the lubricant groove 52, it is possible to prevent the lubricant groove 52 from being clogged with burrs. Because the mold mating surfaces 61 align with the perpendicular surface 57', the seal ring material will never protrude from the outer surface 54 or inner surface 55 even if the mating surfaces of the fixed mold and the movable mold displace slightly relative to each other.

Figure 19A:
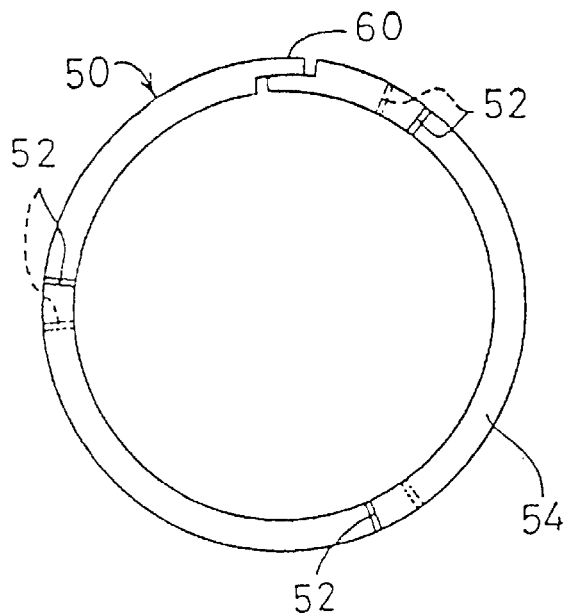
FIG. 19A is a front view of an eighth embodiment of the present invention.
Figure 19C:
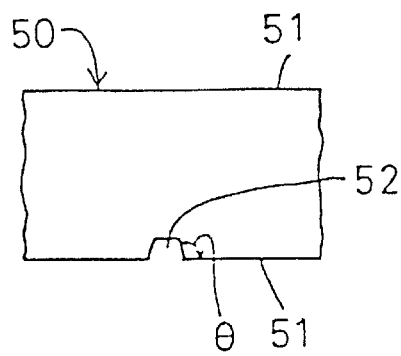
FIG. 19C is a partial enlarged plan view of the eighth embodiment.
Figure 19B:
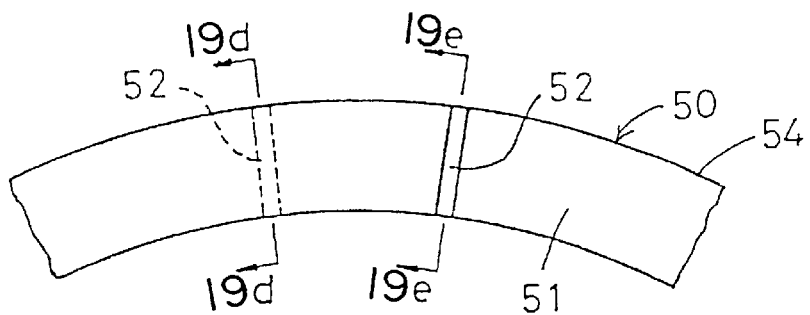
FIG. 19B is a partial enlarged front view of the eighth embodiment.
Figure 19D:
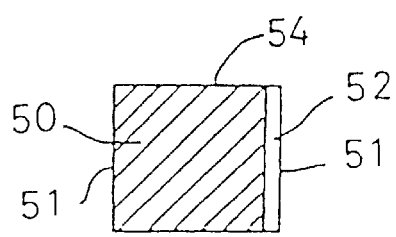
FIG. 19D is a sectional view taken along line 19d—19d of FIG. 19B.
Figure 19E:
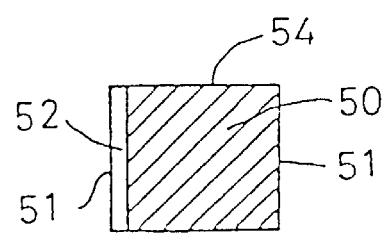
FIG. 19E is a sectional view taken along line 19e—19e of FIG. 19B.
Figure 21A:
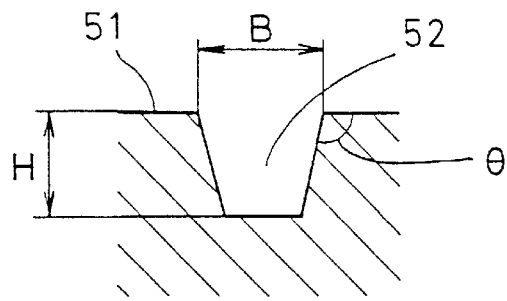
FIGS. 21A–21H are sectional views of various lubricant grooves.
Figure 21B:
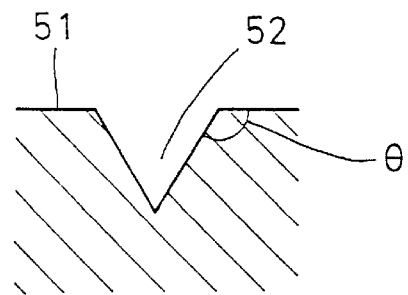
Figure 21C:
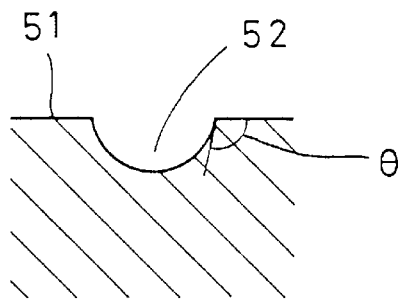
Figure 21D:
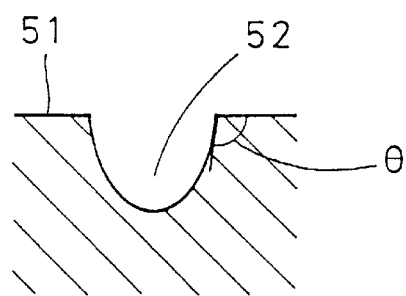
Figure 21E:
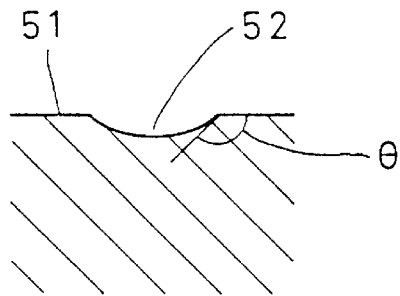
Figure 21F:
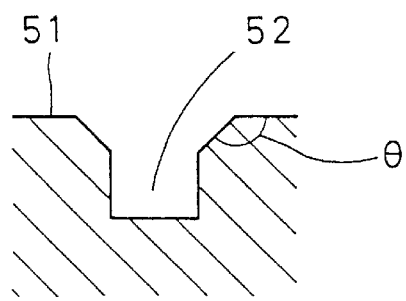
Figure 21G:
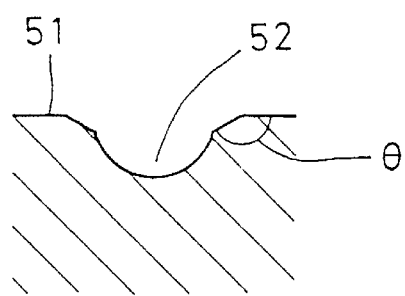
Figure 21H:
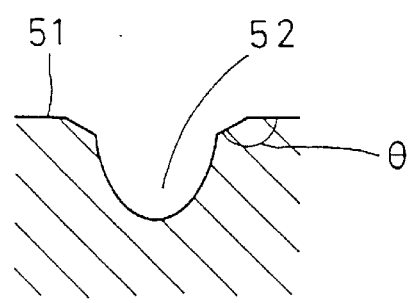

The lubricant grooves 52 may have a square or rectangular section as shown in FIGS. 11C, a trapezoidal section as shown in FIGS. 19C and 20C, or any other section. But preferably, the lubricant grooves have such a sectional shape that their side walls form a right angle or an obtuse angle with the sealing surfaces, because with this arrangement, burrs can be removed easily. FIGS. 21A–21H show such lubricating grooves by way of example. The groove shown in FIG. 21A has a trapezoidal section like the grooves shown in FIGS. 19C and 20C. FIG. 21B shows a V-shaped groove. FIGS. 21C, 21D and 21E show grooves with circular or oval sections. The angle θ is obtuse in any of these examples. In the examples of FIGS. 21F, 21G and 21H, chamfers are formed between the sealing surface 51 and the side walls of the groove so that the angle θ will be obtuse. Preferable range of angle θ is the same as in the ninth embodiment. The grooves should have such a width B and a height H (FIG. 21A) that they can be formed by injection molding. Preferably, the width B is about 0.001–0.1 times, more preferably 0.01–0.05 times, the width or thickness of the seal ring for better lubricant retainability and to achieve closer contact between the seal ring 50 and the mating member. But the width B may be higher or lower than the preferable range. Their height H is preferably set at a value substantially equal to the width B of the groove.

If the width and/or height of the grooves is too large, the contact surface pressure at the portion in sliding contact with the sealing surface of the mating member tends to increase, which can result in increased wear and reduced strength. If too small, lubricant retainability will drop.

Figure 22A:
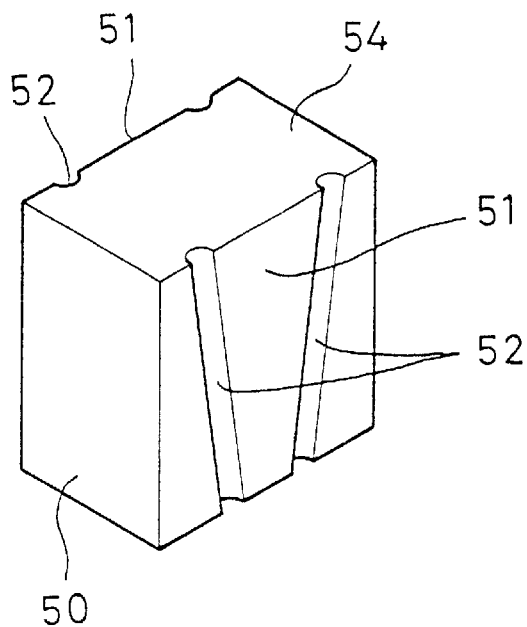
FIGS. 22A–22D are perspective views of various lubricant grooves.
Figure 22B:
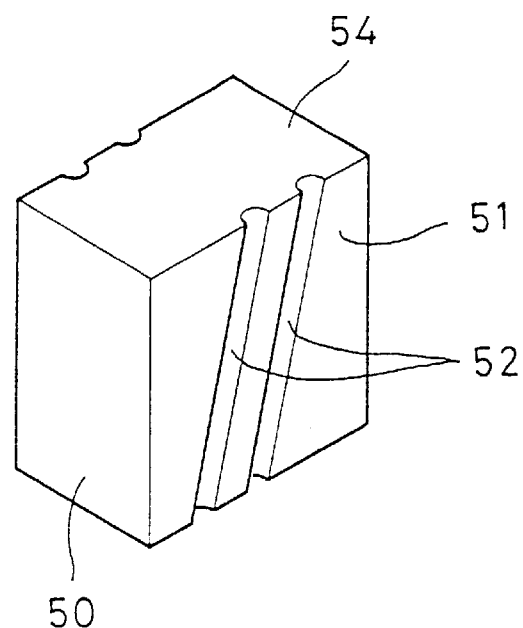
Figure 22C:
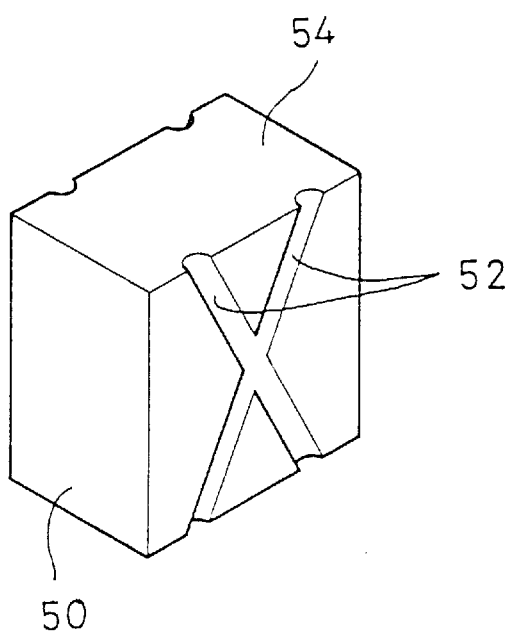
Figure 22D:
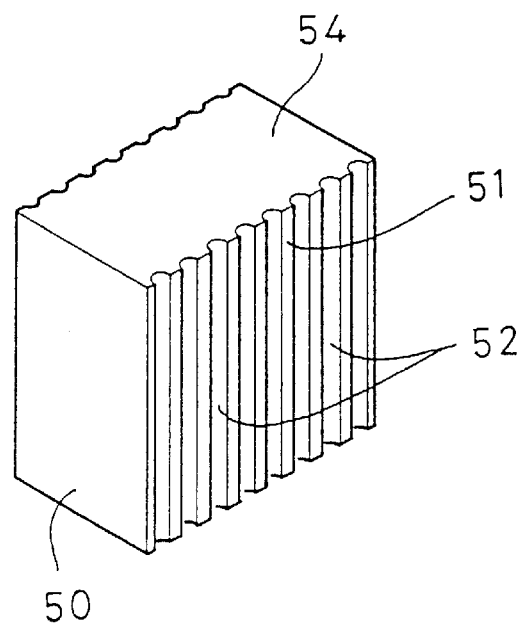
Figure 23A:
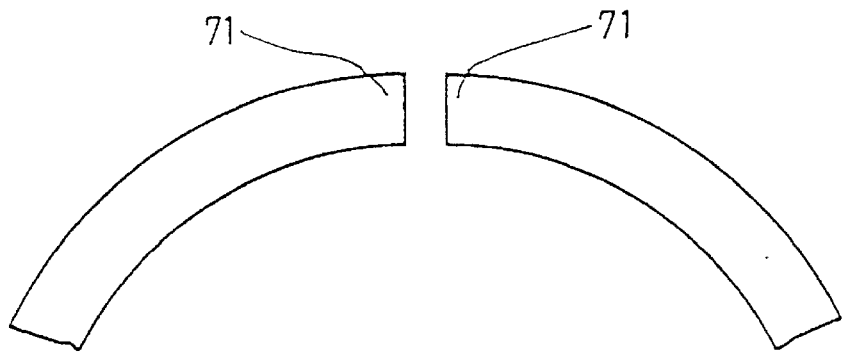
FIG. 23A is a partial front view of a conventional seal ring.
Figure 23B:
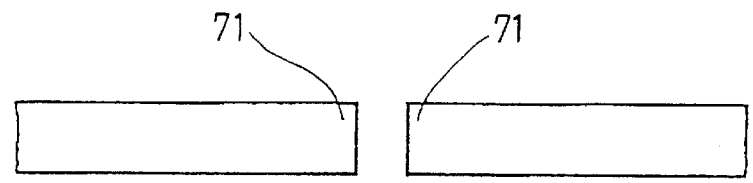
FIG. 23B is a partial plan view of the seal ring shown in FIG. 23A.

FIGS. 22A–22D show different types of lubricant grooves 52. In the example of FIG. 22A, two nonparallel grooves 52 having different widths are formed in each of the outer sealing surface 54 and the inner sealing surface. In the example of FIG. 22B, two parallel grooves 52 are formed in each sealing surface to extend obliquely, i.e. not perpendicularly to the outer sealing surface 54. In the arrangement of FIG. 22C, two lubricant grooves 52 cross each other. In FIG. 22D, a plurality of narrow lubricating grooves 52 are formed at short intervals. By providing lubricant grooves that cross each other, it is possible to supply lubricant uniformly over the surface to be brought into sliding contact with the sealing surface of the mating member even if the number of such grooves is small. By reducing the number of lubricant grooves, it is possible to reduce the contact surface pressure at the sliding surface.

The seal rings formed by the above methods were subjected to endurance tests to evaluate their endurance properties.

EXAMPLE 1

A seal ring having a substantially rectangular section, measuring 50 mm in outer diameter, 2.0 mm in width and 1.8 mm in thickness and having composite step-cut abutments 16, 16' as shown in FIG. 3 was formed by injection-molding a material comprising as a main component polyetherether ketone resin with carbon fiber and tetrafluoroethylene resin added as fillers so that the abutments 16, 16' are spaced from each other (as shown in FIG. 8). It was then set in the jig shown in FIG. 9 and forcibly deformed. In this state, the ring set in the jig was put in an electric furnace and heated at 200° C. for two hours to thermally fix the seal ring.

Figure 10:
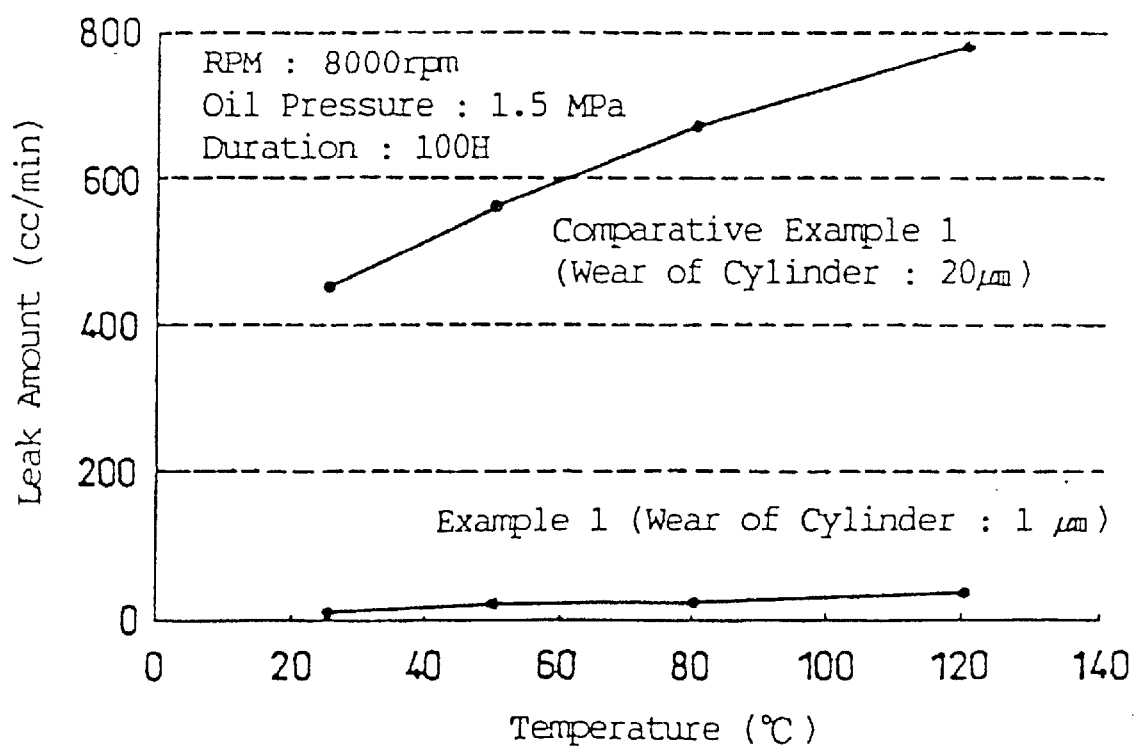
FIG. 10 is a graph showing test results.

The seal ring thus obtained was subjected to a 100-hour endurance test in which a cylinder made of S45C steel was rotated at 8,000 rpm about a fixed mating member or shaft made of S45C steel, using automatic transmission oil for automobiles (DEXIRON II made by Showa Shell Oil), with the oil pressure kept at 1.5 MPa and the oil temperature at 120° C. After the test, the amounts of oil leakage and wear were measured. The results are shown in FIG. 10.

Comparative Example 1

The same material as used in Example 1 was injection-molded to form a seal ring having the same sectional shape, outer diameter, width and thickness as the seal ring prepared in Example 1, with the abutments spread apart, and having angular corners with no protrusions or crowns in the pockets. It was forcibly deformed without subjecting it to thermal fixing. The seal rings thus obtained was mounted on a mating member and subjected to the endurance test under the same conditions. The test results are shown in FIG. 10.

Results

It is apparent from FIG. 10 that in the oil seal ring of Example 1 the leakage of lubricant and the wear of cylinder are markedly small.

EXAMPLE 2

A seal ring having lubricant grooves were formed.

Specifically, a seal ring 50 as shown in FIG. 11 was formed by injection-molding a material comprising as a main component polyetherether ketone resin with carbon fiber and tetrafluoroethylene resin added as fillers. These seal ring 50 had a substantially rectangular section with steps 56 formed at the four corners. It measured 45 mm in outer diameter, 2.4 mm in width and 2.3 mm in thickness. Its outer surface (sliding surface) was 1.5 mm wide and the side faces (sliding surfaces) were 1.8 mm wide.

Each lubricant groove 52 was 0.1 mm deep and 0.1 mm wide. Such grooves were formed at three circumferentially spaced points of the ring in the sealing surfaces 51 on both sides, with the groove 52 in each sealing surface 51 offset about 10° from the grooves 52 in the other sealing surface 51. Crowns 53 were formed at the corners of the lubricating grooves 52.

The sealing ring 50 thus formed was subjected to an endurance test to measure the turning torque and the depths of wear on the ring sides and the groove in the mating shaft. The mating shaft was made of a die-cast aluminum alloy ADC12. The results of the endurance test are shown in Table 1.

The endurance test was conducted under the following conditions.

Oil pressure: 0.8 MPa
Revolving speed: 7000 rpm
Temperature: 120° C.
Duration: 100 hours
Oil: automatic transmission oil for automobiles DEX-IRON II make by Showa Shell Oil
cylinder (rotated): S45C
shaft (fixed): ADC12

Comparative Examples 2 and 3

As Comparative Example 2, the same material as used in Example 2 was formed into a seal ring 50 having an outer diameter of 45 mm and having a 2.3 mm×2.4 mm rectangular section with no steps or lubricant grooves (see FIG. 2).

Figure 18A:
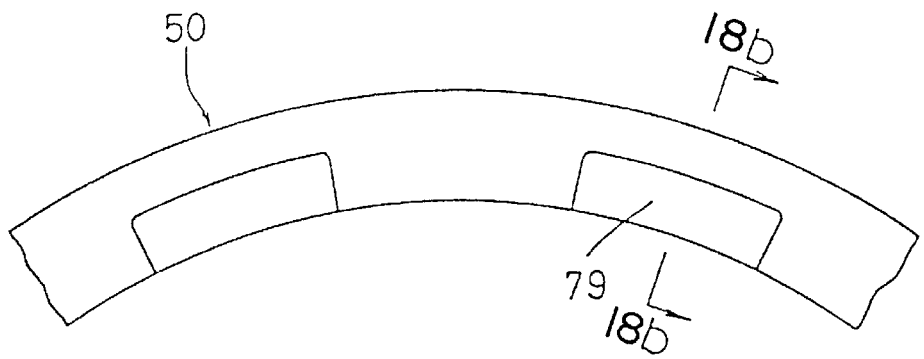
FIG. 18A is a partial enlarged front view of Comparative Example 3.
Figure 18B:
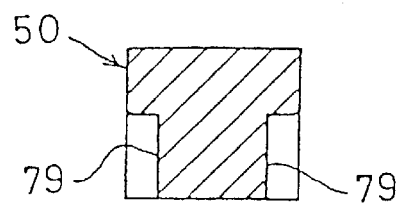
FIG. 18B is a sectional view taken along line 18b—18b of FIG. 18A.

Comparative Example 3 is a seal ring made of the same material and having the same size as Comparative Example 2 and having in its inner periphery recesses 79 extending circumferentially by the length equivalent to an central angle of 15° and spaced from each other by the same length (see FIG. 18).

Comparative Examples 2 and 3 were subjected to the same endurance test as above. The results are shown in Table 1.

Results

In the seal ring of Example 2, the depths of wear of the sides of the ring and the groove in the mating member were small without increasing the turning torque. This is due to the fact that oil flows through the radial lubricant grooves 52 leaks radially inward and outward, forming oil films that cover the entire width of the sliding surfaces on both sides of the ring. Such oil also serves to remove powder resulting from wear and other foreign objects. Also, the amount of such oil leakage is so small that the sealing ability of the seal ring is not impaired.

EXAMPLE 3

Figure 24A:
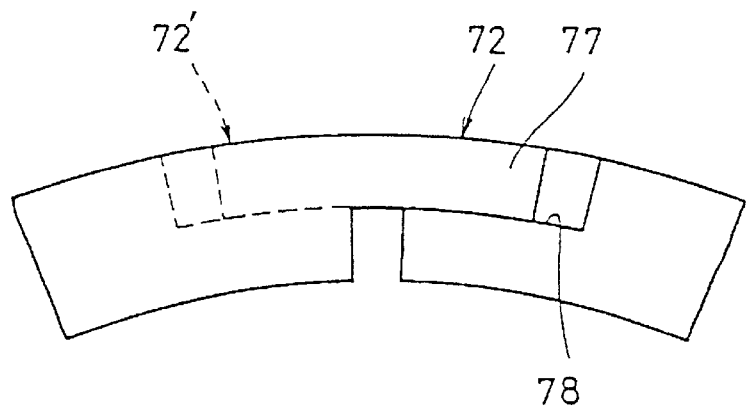
FIG. 24A is a partial front view of another conventional seal ring.
Figure 24B:
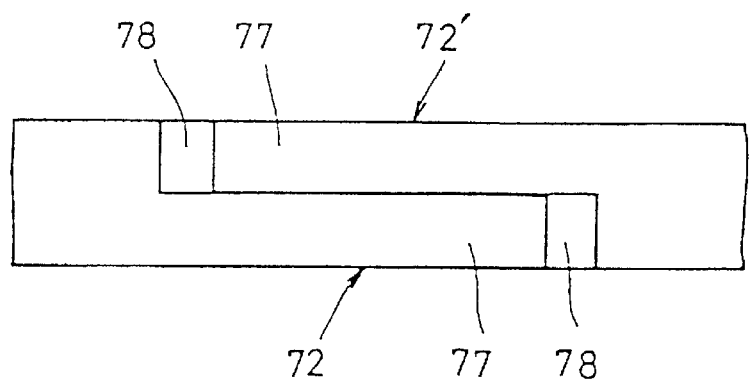
FIG. 24B is a partial plan view of the seal ring shown in FIG. 24A.

A seal ring 50 as shown in FIG. 24 (eighth embodiment) was formed by injection-molding a material comprising 50 wt % PEEK (VICTOREX-PEEK 150P made by I.C.I in England), 20 wt % carbon fibers (M207S made by Kureha Chemical, average fiber diameter 14.5 $\mu$m, aspect ratio 48), 10 wt % PTFE (300H made by Kitamura), and 20 wt % talc (Crown talc made by Matsumura Sangyo, average particle diameter 11 $\mu$m) as a filler. The seal ring 50 obtained had a rectangular section and measured 45 mm in outer diameter, 2.4 mm in width and 2.3 mm in thickness. Its outer sealing surface 54 was 1.5 mm wide, while its sealing surfaces 51 were 1.8 mm wide.

Each lubricant groove 52 was 0.1 mm deep and 0.1 mm wide. Such grooves were formed at three circumferentially spaced points of the ring in the sealing surfaces 51 on both sides, with the groove 52 in one sealing surface 51 offset about 10° from the grooves 52 in the other sealing surface 51. The lubricant grooves 52 had a trapezoidal section as shown in FIG. 24C with the angle θ at 150°. Crowns were formed at the corners of the lubricating grooves 52. Burrs produced when forming the ring were removed by barreling.

The sealing ring 50 thus formed was subjected to an endurance test to measure the turning torque and the depths of wear of the ring sides and the wear in the groove in the mating shaft. The mating shaft was made of a die-cast aluminum alloy ADC12. The results of the endurance test are shown in Table 2.

The endurance test was conducted under the following conditions.

Oil pressure: 0.8 MPa
Revolving speed: 7000 rpm
Temperature: 120° C.
Duration: 100 hours
Oil: automatic transmission oil for automobiles DEX-IRON II made by Showa Shell Oil
cylinder (rotated): S45C
shaft (fixed): ADC12

Comparative Example 4

Figure 28A:
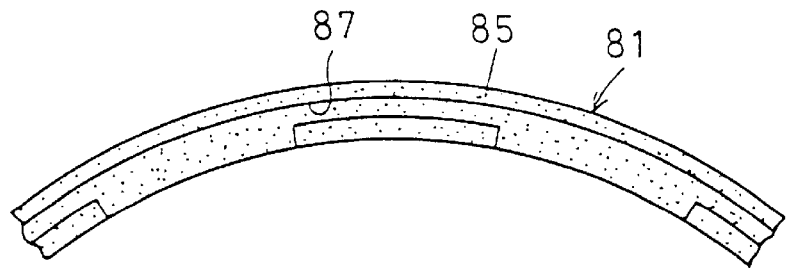
Figure 28B:
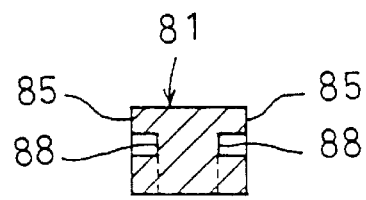
Figure 29A:
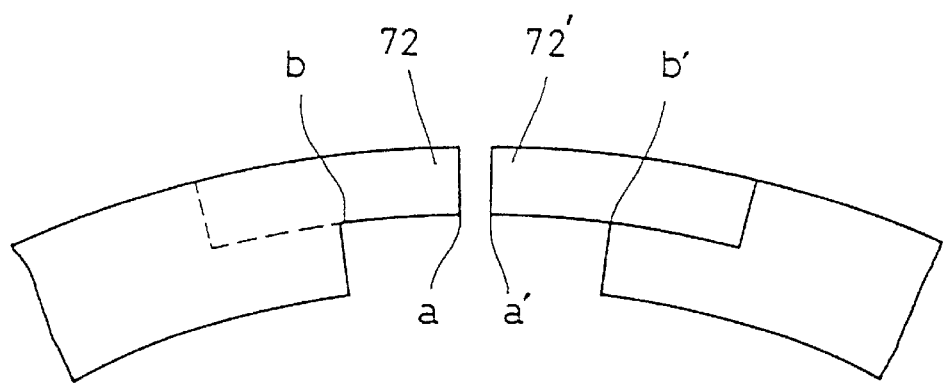
FIG. 29 is a partial front view of the conventional seal ring of FIG. 24 when molded.
Figure 29B:
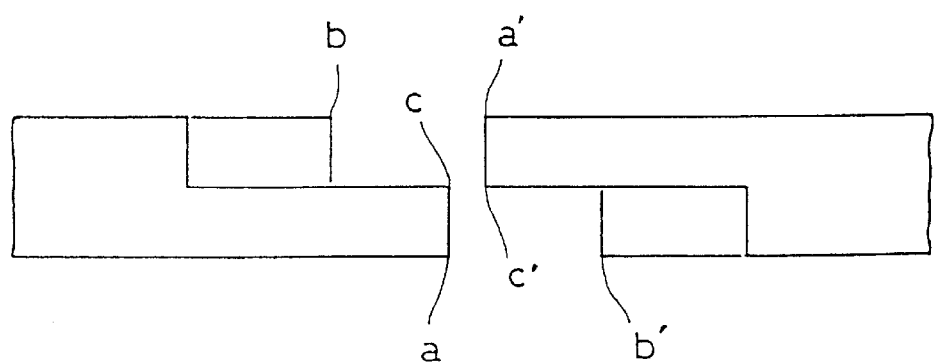
Figure 30:
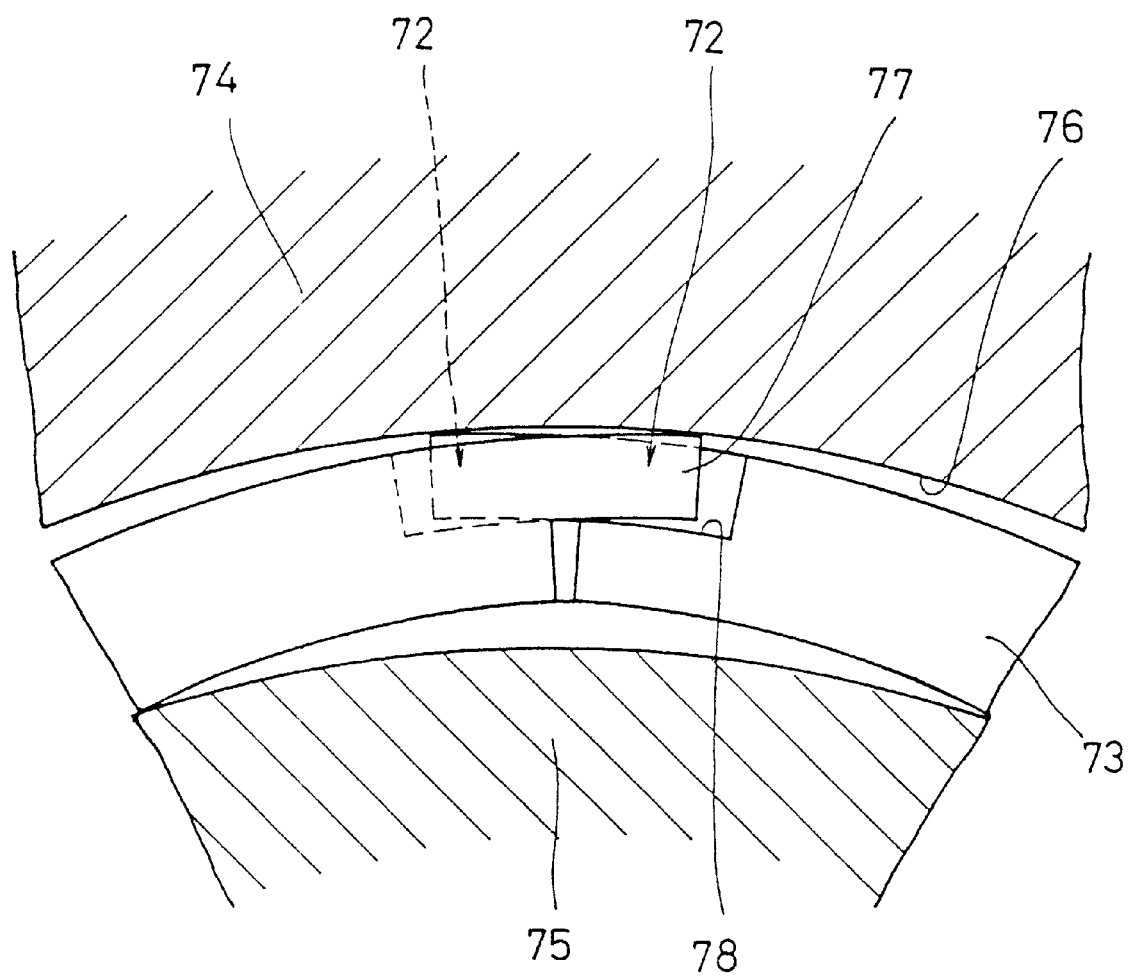
FIG. 30 is a sectional view of the conventional seal ring of FIG. 24 while in use.

The same material as used in Example 3 was formed into a seal ring having an outer diameter of 45 mm with a 2.3 mm×2.4 mm rectangular section and having lubricant grooves with the angle θ'=90° C. as shown in FIG. 28. Burrs were removed by barreling. The seal ring was subjected to the endurance test under the same conditions as in Example 1.

Results

The seal ring of Example 3 showed less wear at the sides of the ring and in the groove in the mating member with the turning torque at the same level. This is due to the fact that oil flows through the radial lubricant grooves 52 leaks radially inward and outward, forming oil films that cover the entire width of the sliding surfaces on both sides of the ring.

Such oil also serves to remove powder resulting from wear and other foreign objects. Also, the amount of such oil leakage is so small that the sealability of the seal ring is not impaired.

Since burrs can be easily removed, productivity is high.

TABLE 1

|  | Rotating Torque (in N · m) | Wear on Side Surface of Ring (in μm) | Wear in Groove of Mating Shaft (in μm) | Leak Amount (in cc/min) |
| --- | --- | --- | --- | --- |
| Example 2 | 0.21 | 1 | 5 | 88 |
| Comparative Example 2 | 0.29 | 10 | 50 | 48 |
| Comparative Example 3 | 0.21 | 5 | 20 | 56 |

TABLE 2

|  | Rotating Torque (in N · m) | Wear on Side Surface of Ring (in μm) | Wear in Groove of Mating Shaft (in μm) | Leak Amount (in cc/min) |
| --- | --- | --- | --- | --- |
| Example 3 | 0.21 | 1 | 5 | 88 |
| Comparative Example 4 | 0.29 | 10 | 50 | 48 |

What is claimed is:

1. A seal ring comprising a synthetic resin ring body defining first and second opposing abutment structures which are spaced a predetermined distance from each other, said first abutment structure being complementary in shape to said second abutment structure, wherein:

said first abutment structure includes an end face, a protrusion extending from said end face at a first axial side of said ring body, and a shoulder located on a second axial side of said ring body, said shoulder being defined by a recess formed adjacent said protrusion;

said second abutment structure includes an end face, a protrusion extending from said end face at said second axial side of said ring body, and a shoulder located on said first axial side of said ring body, said shoulder being defined by a recess formed adjacent said protrusion on said second side of said ring body;

a first chamfer is formed between an end face of said of said protrusion of said first abutment structure and an outer radial surface of said protrusion of said first abutment structure;

a second chamfer is formed between an end face of said shoulder of said first abutment structure and an outer peripheral surface of said ring body;

a third chamfer is formed between an end face of said protrusion of said second abutment structure and an outer radial surface of said protrusion of said second abutment structure; and a fourth chamfer is formed between an end face of said shoulder of said second abutment structure and said outer peripheral surface of said ring body.

2. The seal ring as claimed in claim 1, wherein fillets are provided between:

said end face of said shoulder of said first abutment structure and an axial inner side face of said protrusion of said first abutment structure;

said end face of said shoulder of said second abutment structure and an axial inner side face of said protrusion of said second abutment structure;

said end face and an outer radial surface of said shoulder of said first abutment structure; and said end face and an outer radial surface of said shoulder of said second abutment structure.

3. The seal ring as claimed in claim 1, wherein:

a predetermined space is provided between said inner radial surface of said protrusion of said first abutment structure and said outer radial surface of said shoulder of said second abutment structure, when said abutment structures are fitted together; and a predetermined space is provided between said inner radial surface of said protrusion of said second abutment structure and said outer radial surface of said shoulder of said first abutment structure when said abutment structures are fitted together.

4. The seal ring as claimed in claim 1, wherein, when said first and second abutment structures are fitted together, opposing axial side surfaces of said protrusions of said first and second abutment structures are spaced by a predetermined distance.

5. A seal ring comprising a synthetic resin ring body defining first and second opposing abutment structures which are spaced a predetermined distance from each other, said first abutment structure being complementary in shape to said second abutment structure, wherein:

said first abutment structure includes an end face, a protrusion extending from said end face at a first side of said ring body relative to a width of an outer peripheral surface of said ring body, and a shoulder located on a second side of said ring body relative to the width of an outer peripheral surface of said ring body, said shoulder being defined by a recess formed adjacent said protrusion;

said second abutment structure includes an end face, a protrusion extending from said end face at said second side of said ring body, and a shoulder located on said first side of said ring body, said shoulder being defined by a recess formed adjacent said protrusion on said second side of said ring body;

a first chamfer is formed between an end face and an inner axial side face of said protrusion of said first abutment structure;

a second chamfer is formed between an end face and an inner axial side face of said protrusion of said second abutment structure, said inner axial side faces of said first and second abutment structures directly opposing each other when said abutment structures are fitted together;

a third chamfer is formed between said end face of said protrusion of said first abutment structure and a radial inner surface of said protrusion of said first abutment structure, said radial inner surface confronting said shoulder of said second abutment structure when said abutment structures are fitted together;

a fourth chamfer is formed between said end face of said protrusion of said second abutment structure and a radial inner surface of said protrusion of said second abutment structure, said radial inner surface confronting said shoulder of said first abutment structure when said abutment structures are fitted together;

a fifth chamfer is formed between an outer radial surface of said shoulder of said first abutment structure and said end face of said first abutment structure; and a sixth chamfer is formed between an outer radial surface of said shoulder of said second abutment structure and said end face of said second abutment structure.

6. The seal ring as claimed in claim 5, wherein fillets are provided between:
- an end face of said shoulder of said first abutment structure and said inner radial side face of said protrusion of said first abutment structure;
- an end face of said shoulder of said second abutment structure and said inner radial side face of said protrusion of said second abutment structure;
- said end face of said shoulder of said first abutment structure and an outer periphery of said ring body; and
- said end face of said shoulder of said second abutment structure and an outer periphery of said ring body.

7. The seal ring as claimed in claim 1, wherein:
- a seventh chamfer is formed between said end face of said protrusion of said first abutment structure and an outer radial surface thereof;
- an eighth chamfer is formed between said end face of said protrusion of said second abutment structure and an outer radial surface thereof;
- a ninth chamfer is formed between an end face of said shoulder of said first abutment structure and said outer peripheral surface of said ring body; and
- a tenth chamfer is formed between an end face of said shoulder of said second abutment structure and said outer peripheral surface of said ring body.

8. The seal ring as claimed in claim 7, wherein fillets are provided between:
- said end face of said shoulder of said first abutment structure and said inner axial side face of said protrusion of said first abutment structure;
- said end face of said shoulder of said second abutment structure and said inner axial side face of said protrusion of said second abutment structure;
- said end face of said shoulder of said first abutment structure and an outer periphery of said ring body; and
- said end face of said shoulder of said second abutment structure and an outer periphery of said ring body.

9. The seal ring as claimed in claim 5, wherein:
- a predetermined space is provided between said inner radial surface of said protrusion of said first abutment structure and said outer radial surface of said shoulder of said second abutment structure, when said abutment structures are fitted together; and
- a predetermined space is provided between said inner radial surface of said protrusion of said second abutment structure and said outer radial surface of said shoulder of said first abutment structure when said abutment structures are fitted together.

10. The seal ring as claimed in claim 1, wherein, when said first and second abutment structures are fitted together, opposing axial side surfaces of said protrusions of said first and second abutment structures are spaced by a predetermined distance.

* * * * *